US012257839B2

(12) United States Patent
Nakayama

(10) Patent No.: US 12,257,839 B2
(45) Date of Patent: Mar. 25, 2025

(54) HEAD CHIP, LIQUID JET HEAD, AND LIQUID JET RECORDING DEVICE

(71) Applicant: SII Printek Inc., Chiba (JP)

(72) Inventor: Hitoshi Nakayama, Chiba (JP)

(73) Assignee: SII PRINTEK INC., Chiba (JP)

( * ) Notice: Subject to any disclaimer, the term of this patent is extended or adjusted under 35 U.S.C. 154(b) by 231 days.

(21) Appl. No.: 18/080,534

(22) Filed: Dec. 13, 2022

(65) Prior Publication Data

US 2023/0191783 A1 Jun. 22, 2023

(30) Foreign Application Priority Data

Dec. 20, 2021 (JP) ................................ 2021-206360

(51) Int. Cl.
*B41J 2/14* (2006.01)
*B41J 2/16* (2006.01)

(52) U.S. Cl.
CPC ........... *B41J 2/14201* (2013.01); *B41J 2/161* (2013.01); *B41J 2002/14362* (2013.01); (Continued)

(58) Field of Classification Search
CPC ...... B41J 2/161; B41J 2/1612; B41J 2/16123; B41J 2/16126; B41J 2/1632; B41J 2/1642; B41J 2/14; B41J 2/14201; B41J 2/14233; B41J 2/2103; B41J 2002/14362; B41J 2002/14491; B41J 2202/11; B41J 2202/12; B41J 2202/18
See application file for complete search history.

(56) References Cited

U.S. PATENT DOCUMENTS 4,584,590 A 4/1986 Fischbeck et al.
7,845,770 B2 * 12/2010 Seto .................... B41J 2/14233 347/68

(Continued)

FOREIGN PATENT DOCUMENTS

JP 2006-187188 A 7/2006
JP 2013-059934 A 4/2013

OTHER PUBLICATIONS

Extended European Search Report in Europe Application No. 22214392.7, dated May 16, 2023, 48 pages.

(Continued)

*Primary Examiner* — Leslie J Evanisko
*Assistant Examiner* — Thomas Ray Knief
(74) *Attorney, Agent, or Firm* — Crowell & Moring LLP

(57) ABSTRACT

A head chip, a liquid jet head, and a liquid jet recording device each capable of increasing pressure generated while achieving power saving are provided. The head chip according to an aspect of the present disclosure includes a flow channel member, an actuator plate, and drive electrodes. The drive electrodes include a first electrode disposed on a first surface of the actuator plate so as to overlap one of a pressure chamber and a partition wall when viewed from a first direction, a second electrode which is disposed on the first surface of the actuator plate so as to be adjacent to the first electrode, and which generates a potential difference from the first electrode, and a first opposed electrode which is individually disposed on a second surface of the actuator plate at a position opposed to the first electrode, and which generates a potential difference from the first electrode.

6 Claims, 22 Drawing Sheets

(52) U.S. Cl.
CPC .... *B41J 2002/14491* (2013.01); *B41J 2/1623* (2013.01); *B41J 2/1642* (2013.01); *B41J 2202/18* (2013.01)

(56) References Cited

U.S. PATENT DOCUMENTS

| | | | | |
|---|---|---|---|---|
| 11,285,722 | B2 * | 3/2022 | Aiba | B41J 2/14233 |
| 2006/0152556 | A1 * | 7/2006 | Sugahara | B41J 2/1646 347/71 |
| 2008/0284825 | A1 | 11/2008 | Seto | |

OTHER PUBLICATIONS

Office Action in Japan Application No. 2021-206360, dated Feb. 4, 2022, including English translation, 8 pages.

* cited by examiner

HEAD CHIP, LIQUID JET HEAD, AND LIQUID JET RECORDING DEVICE

RELATED APPLICATIONS

This application claims priority to Japanese Patent Application No. 2021-206360 filed on Dec. 20, 2021, the entire content of which is incorporated herein by reference.

BACKGROUND OF THE INVENTION

1. Field of the Invention

The present disclosure relates to a head chip, a liquid jet head, and a liquid jet recording device.

2. Description of the Related Art

A head chip to be mounted on an inkjet printer ejects ink contained in a pressure chamber through a nozzle hole to thereby record print information such as a character or an image on a recording target medium. In the head chip, in order to make the head chip eject the ink, first, an electric field is generated in an actuator plate formed of a piezoelectric material to thereby deform the actuator plate. In the head chip, by the pressure in the pressure chamber increasing due to the deformation of the actuator plate, the ink is ejected through the nozzle hole.

Here, as a deformation mode of the actuator plate, there is cited a so-called shear mode in which a shear deformation (a thickness-shear deformation) is caused in the actuator plate due to the electric field to be generated in the actuator plate. In the shear mode, there are included a so-called wall-bend type and a roof-shoot type.

The head chip of the wall-bend type has a configuration in which the pressure chamber is provided to the actuator plate itself. In the head chip of the wall-bend type, by partition walls opposed to each other across the pressure chamber deforming in a direction coming closer to or getting away from each other, the volume in the pressure chamber varies.

In contrast, the head chip of the roof-shoot type has a configuration in which the actuator plate is arranged so as to be opposed to the pressure chambers provided to a flow channel member (see, e.g., the specification of U.S. Pat. No. 4,584,590). In the roof-shoot type head chip, by the actuator plate deforming in the thickness direction, the volume of the pressure chamber varies.

In the head chip of the roof-shoot type, it becomes possible to achieve an improvement in manufacturing efficiency and durability since the pressure chamber is provided to a separated member (the flow channel member) from the actuator plate unlike the head chip of the wall-bend type.

In contrast, in the head chip of the roof-shoot type, since the actuator plate faces only one of surfaces of the pressure chamber, there is problem that it is difficult to ensure the pressure to be generated in the pressure chamber compared to the head chip of the wall-bend type. In the roof-shoot type head chip, in order to ensure the generated pressure, it is necessary to increase a drive voltage.

SUMMARY OF THE INVENTION

The present disclosure provides a head chip, a liquid jet head, and a liquid jet recording device each capable of increasing the pressure to be generated in a pressure chamber when ejecting ink while achieving power saving.

In view of the problems described above, the present disclosure adopts the following aspects.

(1) A head chip according to an aspect of the present disclosure includes a flow channel member in which a plurality of pressure chambers containing liquid is arranged in a state of being partitioned by a partition wall, an actuator plate which is stacked on the flow channel member in a state of being opposed in a first direction to the pressure chambers, and which has a polarization direction set to the first direction, and drive electrodes which are respectively formed on a first surface and a second surface of the actuator plate, the first surface facing to a first side in the first direction, and the second surface facing to a second side as an opposite side to the first side, and which are configured to deform the actuator plate in the first direction so as to respectively change volumes of the pressure chambers, wherein the drive electrodes include a first electrode disposed on the first surface of the actuator plate so as to overlap one of the pressure chamber and the partition wall when viewed from the first direction, a second electrode which is disposed on the first surface of the actuator plate so as to be adjacent to the first electrode, and which is configured to generate a potential difference from the first electrode, and a first opposed electrode which is individually disposed on the second surface of the actuator plate at a position opposed to the first electrode, and which is configured to generate a potential difference from the first electrode.

According to the present aspect, by generating the potential difference between the first electrode and the second electrode, it is possible to generate an electric field in a direction crossing the polarization direction of the actuator plate. Thus, by deforming the actuator plate in the first direction in the shear mode (the roof-shoot type), it is possible to change the volume of the pressure chamber.

Further, in the present aspect, by generating the potential difference between the first electrode and the first opposed electrode, it is possible to generate an electric field also in the polarization direction of the actuator plate. Thus, by deforming the actuator plate in the first direction in the bend mode (a bimorph type), it is possible to change the volume of the pressure chamber.

By deforming the actuator plate in the first direction in both of the drive modes, namely the shear mode and the bend mode, as described above, it is possible to increase the pressure to be generated in the pressure chamber to thereby achieve the power saving.

In particular, in the present aspect, since the first opposed electrode is individually disposed so as to correspond to the first electrode, it results that the first opposed electrodes are disposed on the second surface at intervals. Therefore, it is possible to decrease the capacitance of the actuator plate compared to when, for example, the first opposed electrode is formed throughout the entire area of the second surface. As a result, it is possible to improve a response characteristic of the actuator plate, and at the same time, it is possible to suppress the heat generation in the actuator plate.

(2) In the head chip according to the aspect (1) described above, the drive electrodes can include a second opposed electrode which is opposed to the second electrode on the second surface, and which is disposed so as to be adjacent to the first opposed electrode, and the second opposed electrode can be configured to generate a potential difference in the first direction from the second electrode, and can be configured to generate a potential difference in a direction crossing the first direction from the first opposed electrode.

According to the present aspect, since the first opposed electrode and the second opposed electrode are disposed on the second surface so as to be adjacent to each other, it is possible to deform the actuator plate in the shear mode due to the potential difference generated between the first opposed electrode and the second opposed electrode.

Further, it is possible to deform the actuator plate in the bend mode due to the potential difference generated between the second electrode and the second opposed electrode. As a result, it is possible to achieve a further increase in pressure to be generated, and the power saving.

(3) In the head chip according to the aspect (2) described above, the first surface of the actuator plate can be arranged so as to be opposed in the first direction to the flow channel member, and a whole of the second electrode can be disposed at a position overlapping the partition wall when viewed from the first direction.

According to the present aspect, since the second electrode is not formed in a portion of the first surface of the actuator plate, the portion being opposed to the pressure chamber, it is easy to ensure the area of the electrode (the first electrode) formed in the portion of the first surface opposed to the pressure chamber. As a result, it is easy to ensure the electric field to be generated in the actuator plate due to the first electrode, and thus, it is easy to increase the pressure to be generated in the pressure chamber.

Further, since the second electrode is not formed in the portion of the first surface of the actuator plate, the portion being opposed to the pressure chamber, it is possible to prevent the deformation of the actuator plate from being hindered by the second electrode when the portion of the actuator plate opposed to the pressure chamber deforms. In other words, since it is possible to spread the starting point of the deformation of the actuator plate up to the boundary portion between the actuator plate and the partition wall, it is possible to ensure the deformation amount of the actuator plate to increase the pressure to be generated.

(4) In the head chip according to one of the aspects (2) and (3) described above, a part of the second opposed electrode can be disposed so as to be opposed to the second electrode at a position overlapping the partition wall when viewed from the first direction, and a remaining part of the second opposed electrode can be disposed at a position overlapping the pressure chamber when viewed from the first direction.

According to the present aspect, in the state in which a part of the second opposed electrode is opposed to the second electrode, a remaining part the second opposed electrode is made to extend up to the position opposed to the pressure chamber. Thus, when the actuator plate deforms in the bend mode, the electric field to be generated in the actuator plate due to the potential difference between the second opposed electrode and the second electrode can effectively be generated in a portion of the actuator plate, the portion being opposed to the pressure chamber. Further, since it is possible to make the first opposed electrode and the second opposed electrode close to each other, when the actuator plate deforms in the shear mode, the electric field to be generated in the actuator plate due to the potential difference between the first opposed electrode and the second opposed electrode can effectively be generated in the portion of the actuator plate, the portion being opposed to the pressure chamber.

As a result, it is possible to efficiently deform the actuator plate.

(5) In the head chip according to any one of the aspects (1) through (4) described above, a whole of the first electrode and the first opposed electrode can be disposed at a position opposed in the first direction to the pressure chamber.

According to the present aspect, the whole of the first opposed electrode and the first electrode is disposed so as to be opposed to the pressure chamber. Thus, when the actuator plate deforms in the bend mode, the electric field to be generated in the actuator plate due to the potential difference between the first opposed electrode and the first electrode can effectively be generated in a portion of the actuator plate, the portion being opposed to the pressure chamber. Therefore, it is possible to efficiently deform the actuator plate.

(6) In the head chip according to any one of the aspects (1) through (5) described above, there can further be included a regulating member which is configured to regulate a displacement of the actuator plate toward an opposite side to the flow channel member in the first direction, and which is stacked at an opposite side to the flow channel member across the actuator plate in the first direction.

According to the present aspect, it is possible to regulate the displacement of the actuator plate toward the opposite side to the flow channel member in the first direction with respect to the resistive force (compliance) of the liquid acting on the actuator plate due to, for example, the pressure of the liquid in the pressure chamber using the regulating member. Thus, it is possible to effectively propagate the deformation of the actuator plate toward the pressure chamber. As a result, it is possible to increase the pressure generated in the pressure chamber when deforming the actuator plate to thereby achieve the power saving.

(7) A liquid jet head according to an aspect of the present disclosure includes the head chip according to any one of the aspects (1) through (6) described above.

According to the present aspect, it is possible to provide a liquid jet head which is power-saving and high-performance.

(8) A liquid jet recording device according to an aspect of the present disclosure includes the liquid jet head according to the aspect (7) described above.

According to the present aspect, it is possible to provide a liquid jet recording device which is power-saving and high-performance.

According to an aspect of the present disclosure, it is possible to increase the pressure to be generated while achieving the power saving.

DETAILED DESCRIPTION OF THE PREFERRED EMBODIMENTS

Figure 1:
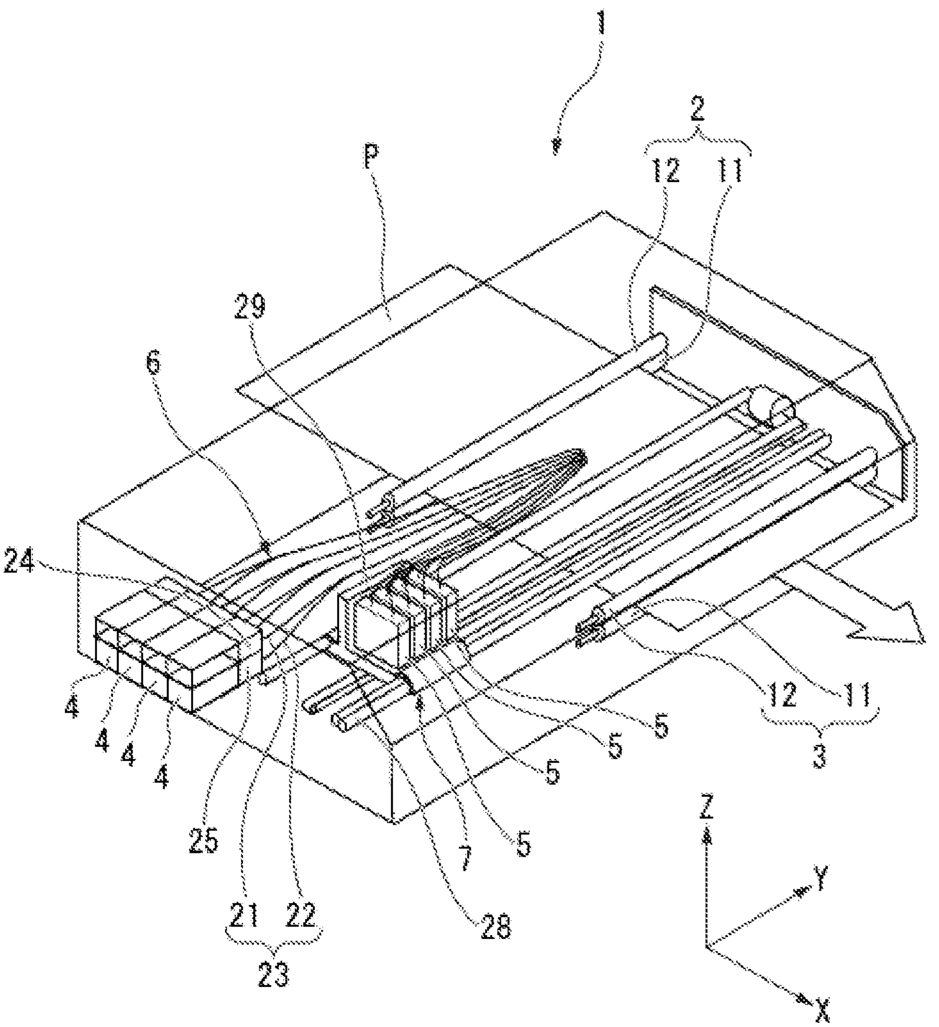
FIG. 1 is a schematic configuration diagram of an inkjet printer according to a first embodiment.

An embodiment according to the present disclosure will hereinafter be described with reference to the drawings. In the embodiment and modified examples described hereinafter, constituents corresponding to each other are denoted by the same reference symbols, and the description thereof will be omitted in some cases. In the following description, expressions representing relative or absolute arrangement such as "parallel," "perpendicular," "center," and "coaxial" not only represent strictly such arrangements, but also represent the state of being relatively displaced with a tolerance, or an angle or a distance to the extent that the same function can be obtained. In the following embodiment, the description will be presented citing an inkjet printer (hereinafter simply referred to as a printer) for performing recording on a recording target medium using ink (liquid) as an example. The scale size of each member is arbitrarily modified so as to provide a recognizable size to the member in the drawings used in the following description.

First Embodiment

Printer 1

FIG. 1 is a schematic configuration diagram of a printer 1.

The printer (a liquid jet recording device) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink in accordance with the ink tanks 4 coupled thereto.

Figure 2:
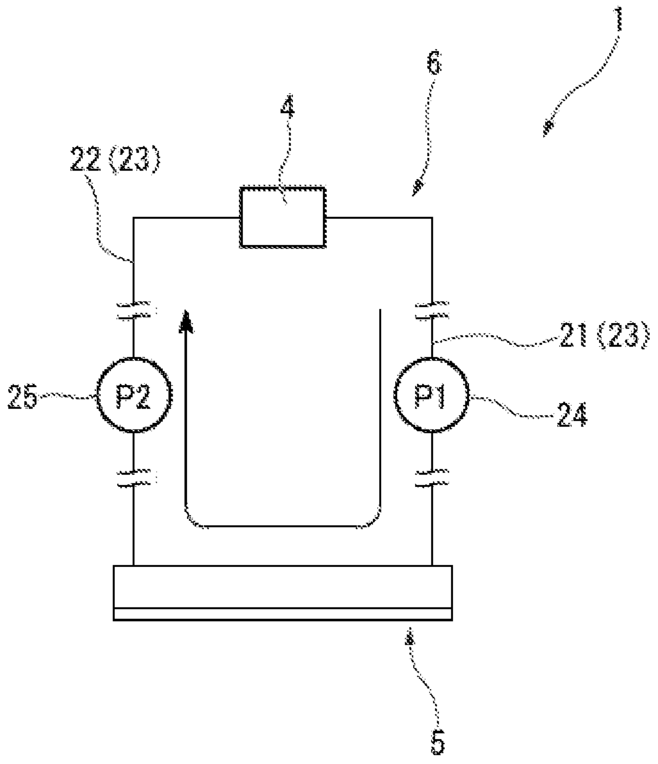
FIG. 2 is a schematic configuration diagram of an inkjet head and an ink circulation mechanism according to the first embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes an inside of the ink discharge tube 22 to suction the ink from the inkjet head 5 through the ink discharge tube 22. Thus, the ink discharge tube 22 is provided with negative pressure with respect to the ink jet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, and a carriage 29 movably supported by the guide rail 28.

Inkjet Heads 5

The inkjet heads 5 are mounted on the carriage 29. In the illustrative example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a controller (not shown) for applying a drive voltage to the head chip 50.

Head Chip 50

Figure 3:
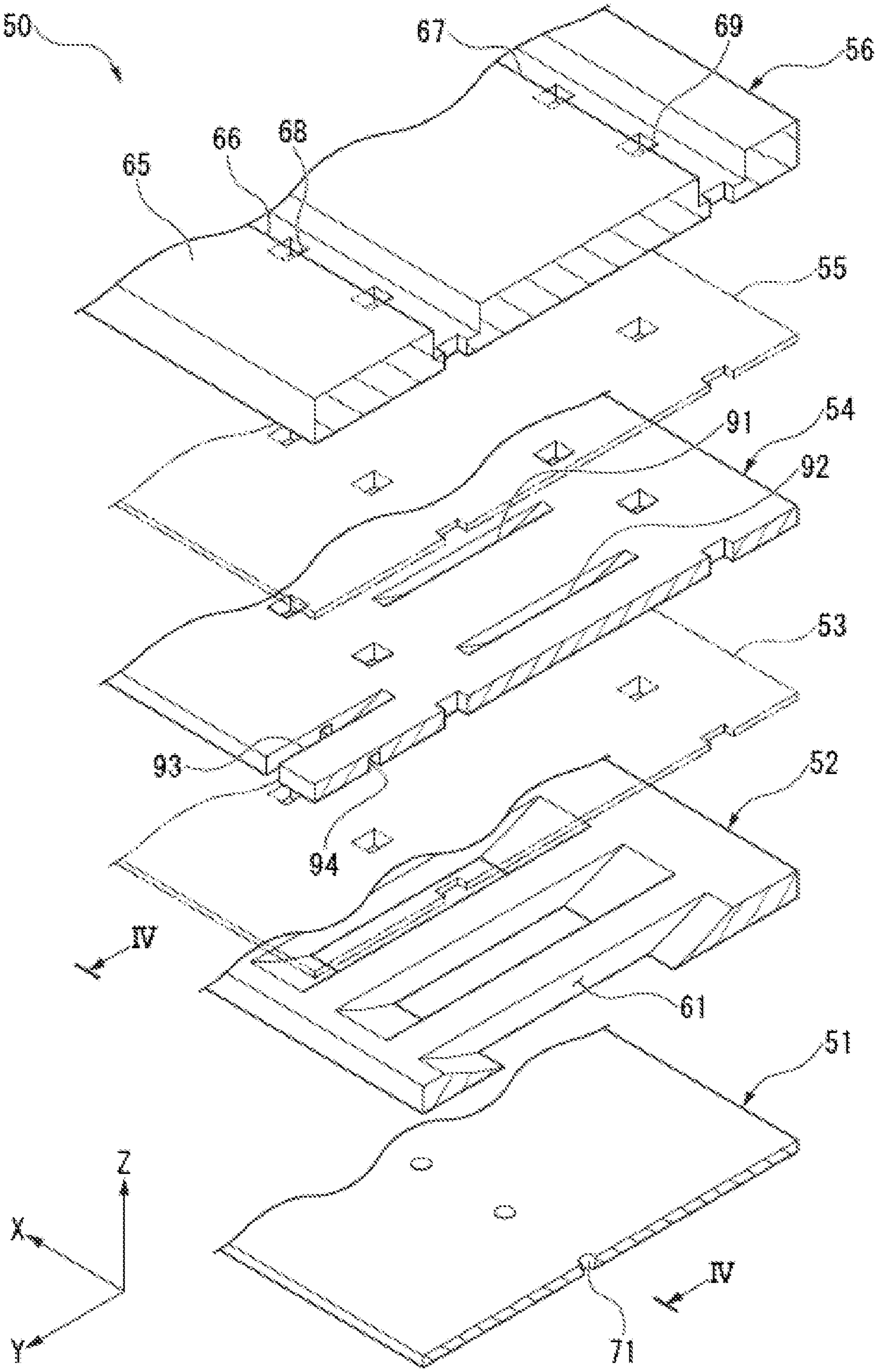
FIG. 3 is an exploded perspective view of a head chip according to the first embodiment.
Figure 4:
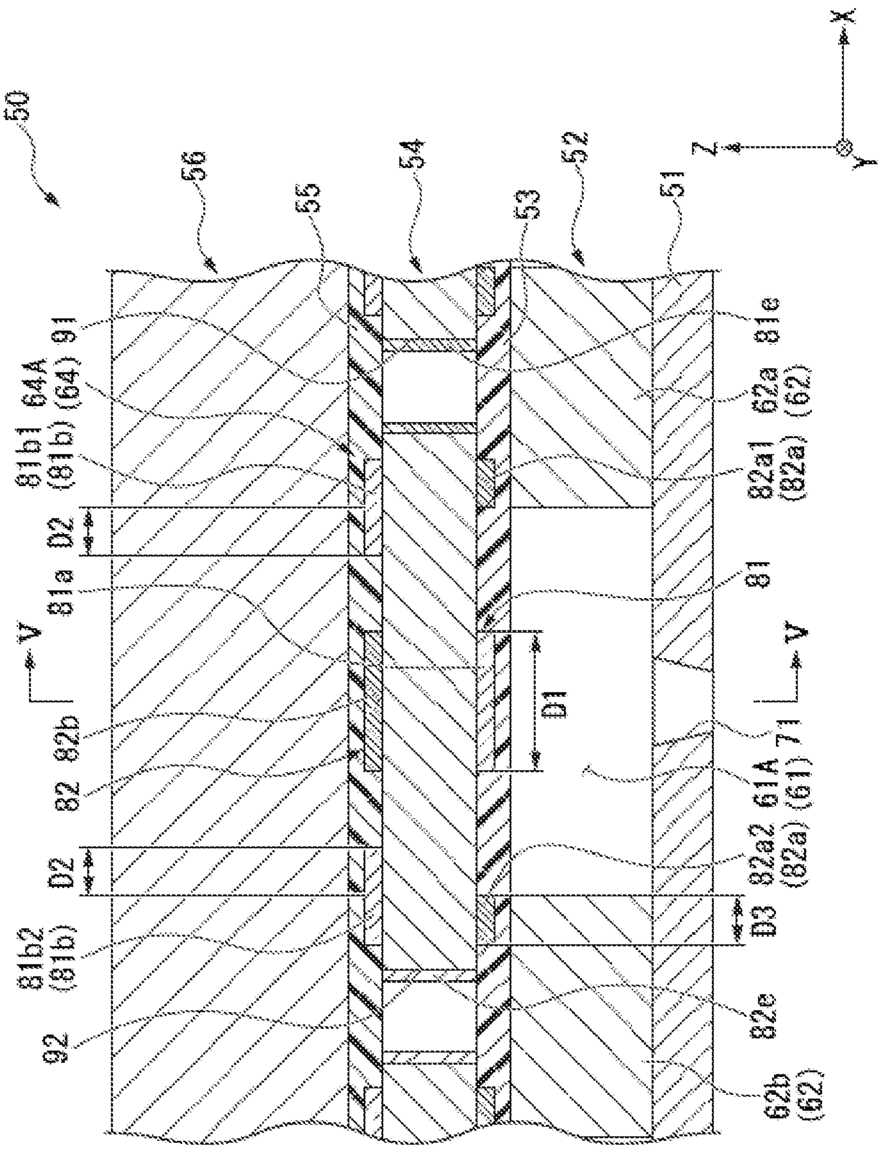
FIG. 4 is a cross-sectional view of the head chip corresponding to the line IV-IV shown in FIG. 3.
Figure 5:
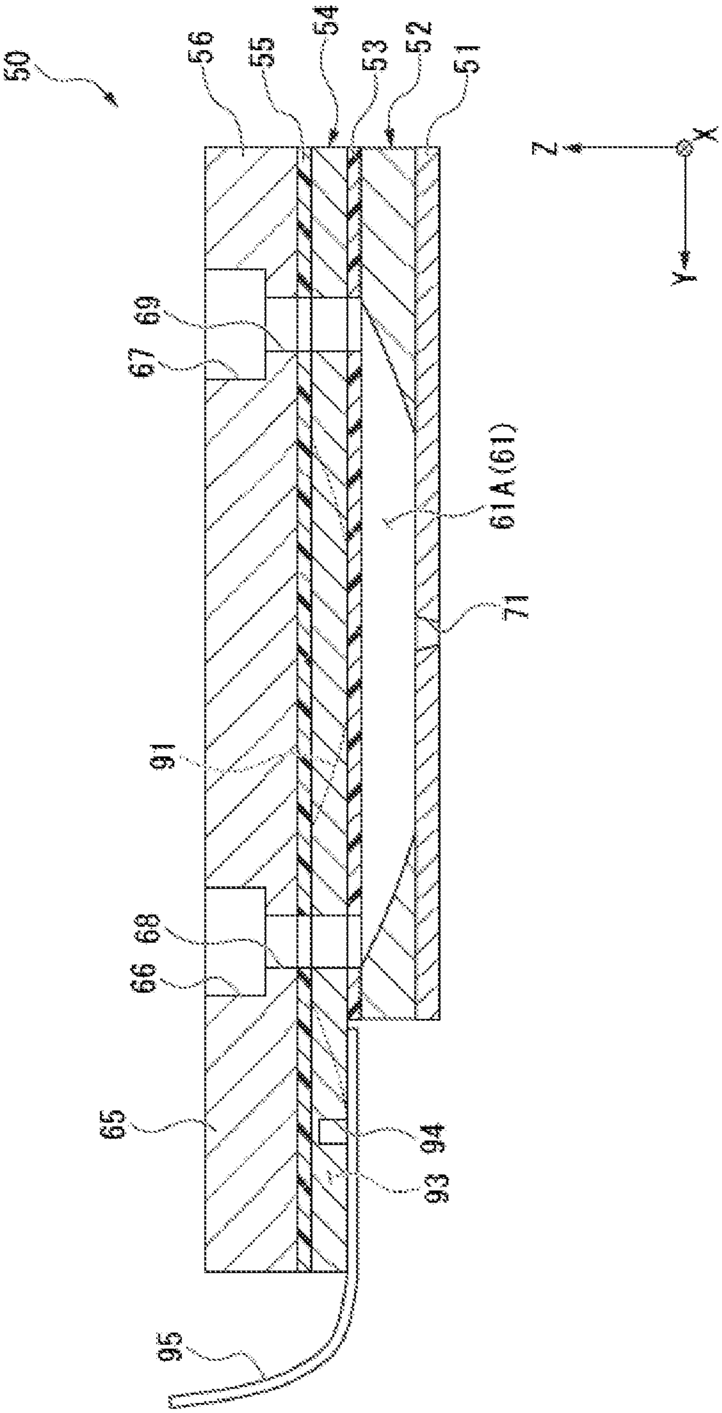
FIG. 5 is a cross-sectional view of the head chip corresponding to the line V-V shown in FIG. 4.

FIG. 3 is an exploded perspective view of the head chip 50. FIG. 4 is a cross-sectional view of the head chip 50 corresponding to the line IV-IV shown in FIG. 3. FIG. 5 is a cross-sectional view of the head chip 50 corresponding to the line V-V shown in FIG. 4.

The head chip 50 shown in FIG. 3 through FIG. 5 is a so-called recirculating side-shoot type head chip 50 which circulates the ink with the ink tank 4, and at the same time, ejects the ink from a central portion in an extending direction (the Y direction) in a pressure chamber 61 described later. The head chip 50 is provided with a nozzle plate 51, a flow channel member 52, a first film 53, an actuator plate 54, a second film 55, and a cover plate 56. In the following explanation, the description is presented in some cases defining a direction (+Z side) from the nozzle plate 51 toward the cover plate 56 along the Z direction as an upper side, and a direction (−Z side) from the cover plate 56 toward the nozzle plate 51 along the Z direction as a lower side.

The flow channel member 52 is shaped like a plate setting a thickness direction to the Z direction. The flow channel member 52 is formed of a material having ink resistance. As such a material, it is possible to adopt, for example, metal, metal oxide, glass, resin, and ceramics. The flow channel member 52 is provided with a plurality of pressure chambers 61. The pressure chambers 61 each contain the ink. The pressure chambers 61 are arranged in the X direction at intervals. Therefore, in the flow channel member 52, a portion located between the pressure chambers 61 adjacent to each other constitutes a partition wall 62 for partitioning the pressure chambers 61 adjacent to each other in the X direction.

The pressure chambers 61 are each formed like a groove linearly extending in the Y direction. The pressure chambers 61 each penetrate the flow channel member 52 in at least a part (a central portion in the Y direction in the first embodiment) in the Y direction. It should be noted that the configuration in which a channel extension direction coincides with the Y direction will be described in the first embodiment, but the channel extension direction can cross the Y direction. Further, a planar shape of the pressure chamber 61 is not limited to a rectangular shape (a shape setting a longitudinal direction to either one of the X direction and the Y direction, and setting a short-side direction to the other thereof). The planar shape of the pressure chamber 61 can be a polygonal shape such as a square shape or a triangular shape, a circular shape, an elliptical shape, or the like.

The nozzle plate 51 is fixed to a lower surface of the flow channel member 52 with bonding or the like. The nozzle plate 51 becomes equivalent in planar shape to the flow channel member 52. Therefore, the nozzle plate 51 closes a lower end opening part of the pressure chamber 61. In the first embodiment, the nozzle plate 51 is formed of a resin material such as polyimide so as to have a thickness in a range of several tens through one hundred and several tens of micrometers. It should be noted that it is possible for the nozzle plate 51 to have a single layer structure or a laminate structure with a metal material (SUS, Ni—Pd, or the like), glass, silicone, or the like besides the resin material.

The nozzle plate 51 is provided with a plurality of nozzle holes 71 penetrating the nozzle plate 51 in the Z direction. The nozzle holes 71 are arranged at intervals in the X direction. The nozzle holes 71 are each communicated with corresponding one of the pressure chambers 61 in a central portion in the X direction and the Y direction. In the first embodiment, each of the nozzle holes 71 is formed to have, for example, a taper shape having an inner diameter gradually decreasing along a direction from the upper side toward the lower side. In the first embodiment, there is described the configuration in which the plurality of pressure chambers 61 and the plurality of nozzle holes 71 are aligned in the X direction, but this configuration is not a limitation. Defining the plurality of pressure chambers 61 and the plurality of nozzle holes 71 arranged in the X direction as a nozzle array, it is possible to dispose two or more nozzle arrays at intervals in the Y direction. In this case, defining the number of nozzle arrays as n, it is preferable for an arrangement pitch in the Y direction of the nozzle holes 71 (the pressure chambers 61) in one of the nozzle arrays to be arranged so as to be shifted by 1/n pitch with respect to the arrangement pitch of the nozzle holes 71 in another nozzle array adjacent to that nozzle array.

The first film 53 is fixed to an upper surface of the flow channel member 52 with bonding or the like. The first film 53 is arranged throughout the entire area of the upper surface of the flow channel member 52. Thus, the first film 53 closes an upper end opening part of each of the pressure chambers 61. The first film 53 is formed of an elastically deformable material having an insulating property and ink resistance. As such a material, the first film 53 is formed of, for example, a resin material (a polyimide type, an epoxy type, a polypropylene type, and so on). In the first embodiment, the term "elastically deformable" means that the material is lower in compressive elasticity modulus compared to a member adjacent thereto in the Z direction in a state in which two or more members are stacked on one another. In other words, the first film 53 is lower in compressive elasticity modulus than the flow channel member 52 and the actuator plate 54.

The actuator plate 54 is fixed to an upper surface of the first film 53 with bonding or the like setting the thickness direction to the Z direction. The planar shape of the actuator plate 54 is larger than the planar shape of the flow channel member 52. Therefore, the actuator plate 54 is opposed to the pressure chambers 61 in the Z direction across the first film 53. It should be noted that the actuator plate 54 is not limited to the configuration of covering the pressure chambers 61 in a lump, but can individually be disposed for each of the pressure chambers 61.

The actuator plate 54 is formed of a piezoelectric material such as PZT (lead zirconate titanate). The actuator plate 54 is set so that a polarization direction is a direction toward the −Z side. On both surfaces of the actuator plate 54, there are formed drive interconnections 64. The actuator plate 54 is configured so as to be able to be deformed in the Z direction by an electric field being generated by a voltage applied by the drive interconnections 64. The actuator plate 54 expands or contracts the volume in the pressure chambers 61 due to the deformation in the Z direction to thereby eject the ink from the inside of the pressure chambers 61. It should be noted that the configuration of the drive interconnections 64 will be described later.

The second film 55 is fixed to an upper surface of the actuator plate 54 with bonding or the like. In the first embodiment, the second film 55 covers the entire area of the upper surface of the actuator plate 54. The second film 55 is formed of an elastically deformable material having an insulating property. As such a material, it is possible to adopt substantially the same material as that of the first film 53. In other words, the second film 55 is lower in compressive elasticity modulus than the flow channel member 52 and the actuator plate 54.

The cover plate 56 is fixed to an upper surface of the second film 55 with bonding or the like setting the thickness direction to the Z direction. The cover plate 56 is thicker in thickness in the Z direction than the actuator plate 54, the flow channel member 52, and the films 53, 55. In the first embodiment, the cover plate 56 is formed of metal, metal oxide, glass, resin, ceramics, or the like similarly to the flow channel member 52. The cover plate 56 is higher in compressive elasticity modulus than at least the second film 55. As shown in FIG. 5, in the cover plate 56, the second film 55, and the actuator plate 54, portions projecting toward the +Y side with respect to the flow channel member 52 constitute a tail part 65.

The cover plate 56 is provided with an entrance common ink chamber 66 and an exit common ink chamber 67.

The entrance common ink chamber 66 is formed at a position overlapping, for example, a +Y-side end portion of the pressure chamber 61 when viewed from the Z direction. The entrance common ink chamber 66 extends in the X direction with a length sufficient for straddling, for example, the pressure chambers 61, and at the same time, opens on an upper surface of the cover plate 56.

The exit common ink chamber 67 is formed at a position overlapping, for example, a −Y-side end portion of the pressure chamber 61 when viewed from the Z direction. The exit common ink chamber 67 extends in the X direction with a length sufficient for straddling, for example, the pressure chambers 61, and at the same time, opens on the upper surface of the cover plate 56.

In the entrance common ink chamber 66, at positions overlapping the respective pressure chambers 61 viewed from the Z direction, there are formed entrance slits 68. The entrance slits 68 penetrate the cover plate 56, the second film 55, the actuator plate 54, and the first film 53 in the Z direction. The entrance slits 68 each make the pressure chamber 61 and the entrance common ink chamber 66 be communicated with each other.

In the exit common ink chamber 67, at positions overlapping the respective pressure chambers 61 viewed from the Z direction, there are formed exit slits 69. The exit slits 69 penetrate the cover plate 56, the second film 55, the actuator plate 54, and the first film 53 in the Z direction. The exit slits 69 each make the pressure chamber 61 and the exit common ink chamber 67 be communicated with each other.

Figure 6:
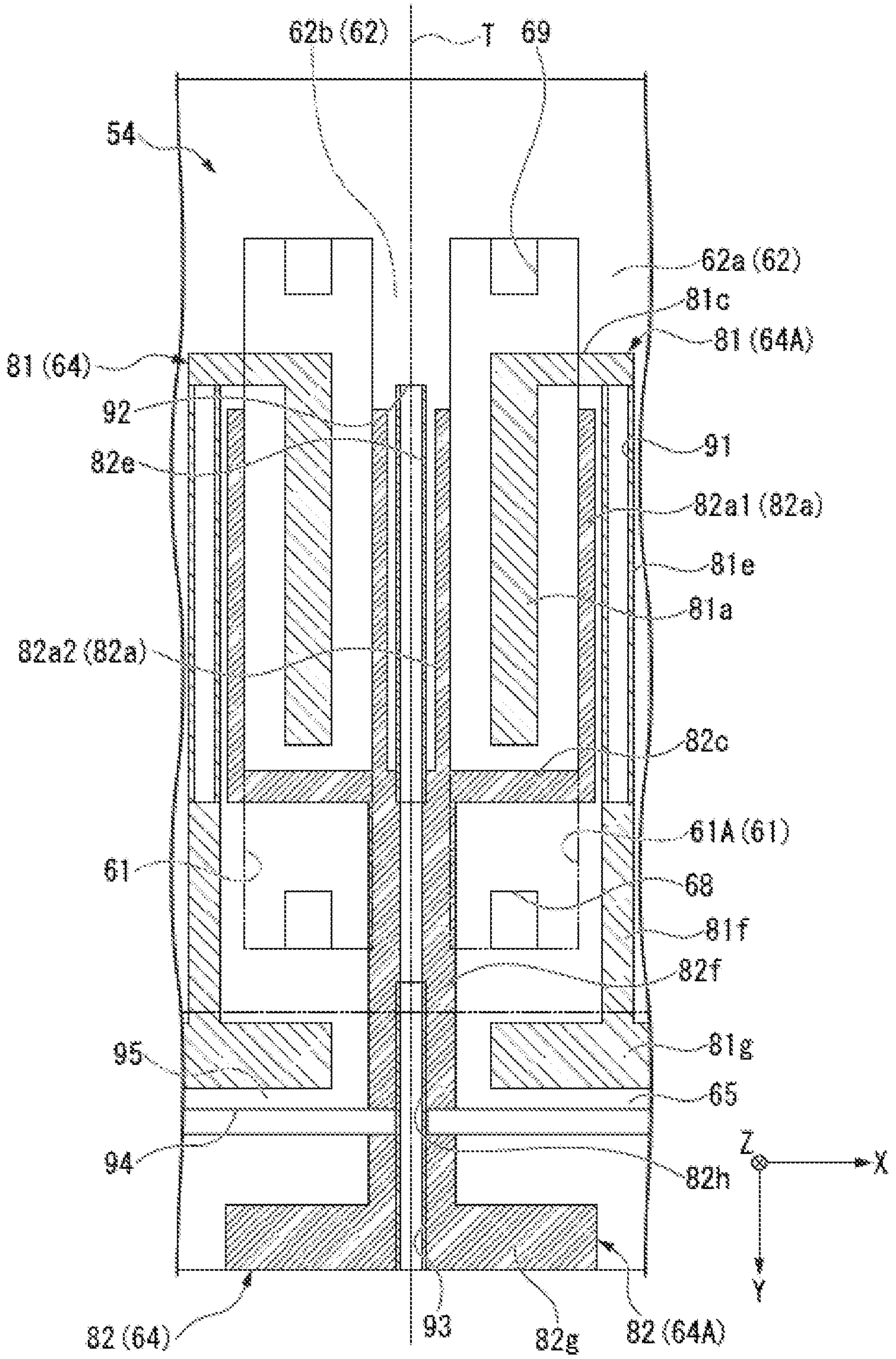
FIG. 6 is a bottom view of an actuator plate related to the first embodiment.
Figure 7:
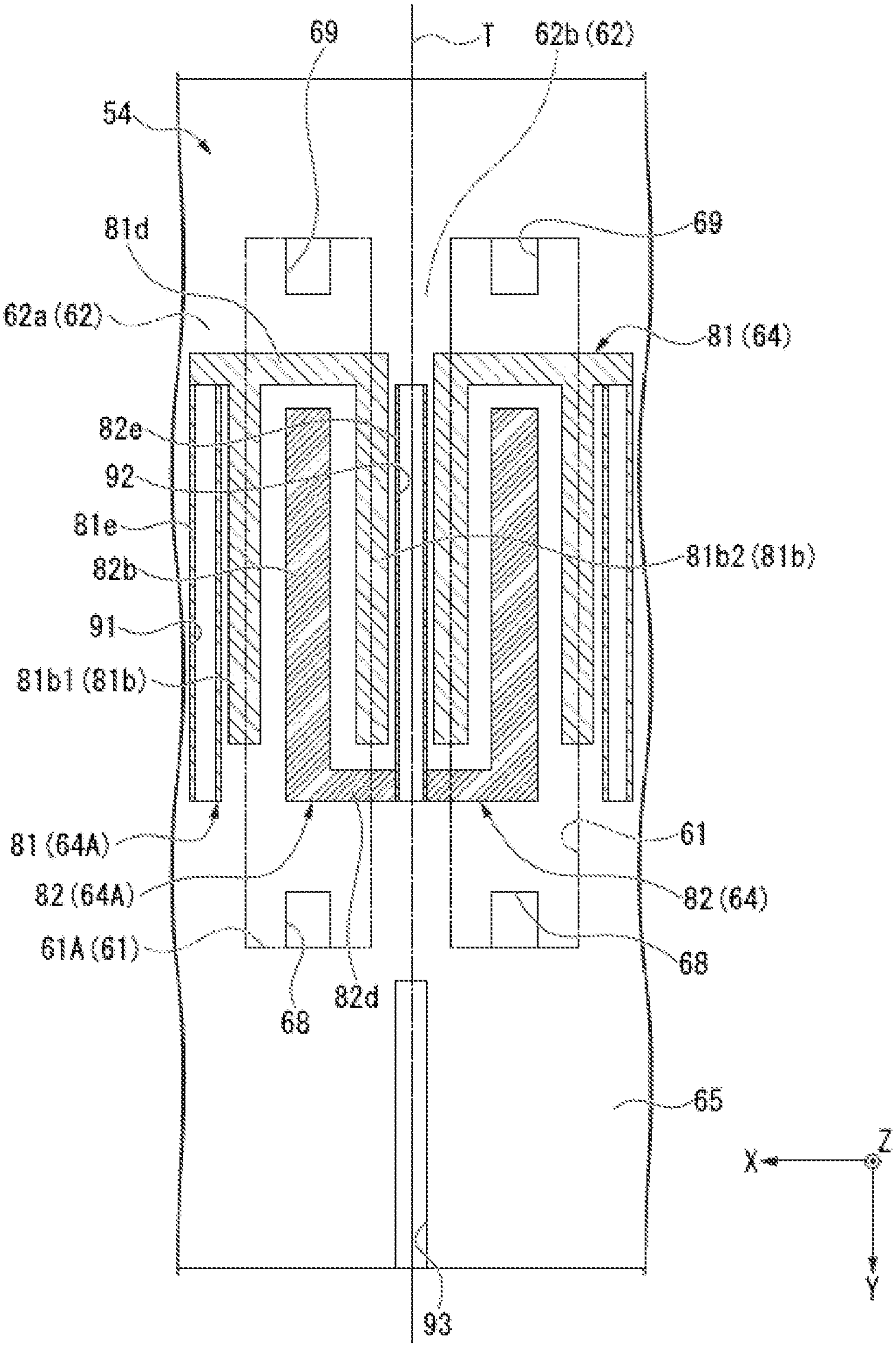
FIG. 7 is a plan view of the actuator plate related to the first embodiment.

Subsequently, a structure of the drive interconnections 64 will be described. FIG. 6 is a bottom view of the actuator plate 54. FIG. 7 is a plan view of the actuator plate 54. The drive interconnections 64 are disposed so as to correspond to the pressure chambers 61. The drive interconnections 64 corresponding to the pressure chambers 61 adjacent to each other are formed line-symmetrically with reference to a symmetry axis T along the Y direction. In the following explanation, drive interconnections 64A disposed so as to correspond to one pressure chamber 61A out of the plurality of pressure chambers 61 are described as an example, and the description of the drive interconnections 64 corresponding other pressure chambers 61 will arbitrarily be omitted.

As shown in FIG. 6 and FIG. 7, the drive interconnections 64A consist of a common interconnection 81 and an individual interconnection 82.

The common interconnection 81 is provided with a first common electrode 81*a*, second common electrodes 81*b*, a lower-surface patterned interconnection 81*c*, an upper-surface patterned interconnection 81*d*, a through interconnection 81*e*, a common coupling interconnection 81*f*, and a common pad 81*g*. It should be noted that in the common interconnection 81, it is preferable to dispose an insulator (e.g., $SiO_2$) not shown between the actuator plate 54 and the portions (the lower-surface patterned interconnection 81*c*, the upper-surface patterned interconnection 81*d*, the through interconnection 81*e*, the common coupling interconnection 81*f*, and the common pad 81*g*) other than the common electrodes 81*a*, 81*b*.

As shown in FIG. 4 and FIG. 6, the first common electrode 81*a* linearly extends in the Y direction at a position opposed to the corresponding pressure chamber 61 in the Z direction on a lower surface of the actuator plate 54. In the illustrative example, the first common electrode 81*a* is formed at a position including a central portion in the X direction in the pressure chamber 61. It should be noted that the first common electrode 81*a* can arbitrarily be changed regarding the width, the position, and so on in the X direction providing the first common electrode 81*a* is formed at the position opposed to the pressure chamber 61.

As shown in FIG. 4 and FIG. 7, the second common electrodes 81*b* linearly extend in the Y direction at positions which do not overlap the first common electrode 81*a* of the corresponding pressure chamber 61 when viewed from the Z direction on the upper surface of the actuator plate 54. In the first embodiment, the second common electrodes 81*b* are respectively formed at both sides in the X direction with respect to the first common electrode 81*a*. The second common electrodes 81*b* are formed at the positions symmetric about the central portion in the X direction in the pressure chamber 61.

When viewed from the Z direction, a part of the second common electrode 81*b* (hereinafter referred to as a +X-side common electrode 81*b*1) located at the +X side out of the second common electrodes 81*b* overlaps the partitioning wall 62 (hereinafter referred to as a partition wall 62*a*) located at the +X side out of the partition walls 62 for partitioning the corresponding pressure chamber 61. A remaining part of the +X-side common electrode 81*b*1 spreads toward the −X side with respect to the partition wall 62*a*. In other words, the remaining part of the +X-side common electrode 81*b*1 overlaps a part of the pressure chamber 61 when viewed from the Z direction.

When viewed from the Z direction, a part of the second common electrode 81*b* (hereinafter referred to as a −X-side common electrode 81*b*2) located at the −X side out of the second common electrodes 81*b* overlaps the partitioning wall 62 (hereinafter referred to as a partition wall 62*b*) located at the −X side out of the partition walls 62 for partitioning the corresponding pressure chamber 61. It should be noted that between the pressure chambers 61 adjacent to each other, the +X-side common electrode 81*b*1 in one of the pressure chambers 61 and the −X-side common electrode 81*b*2 in the other of the pressure chambers 61 are at a distance from each other in the X direction on the partition wall 62.

A remaining part of the −X-side common electrode 81*b*2 spreads toward the +X side with respect to the partition wall 62*b*. In other words, the remaining part of the −X-side common electrode 81*b*2 overlaps a part of the pressure chamber 61 when viewed from the Z direction. It should be noted that it is preferable for a width D1 in the Y direction in the first common electrode 81*a* to be larger compared to a width D2 in the Y direction in a portion overlapping the pressure chamber 61 out of the second common electrodes 81*b*.

As shown in FIG. 6, the lower-surface patterned interconnection 81*c* is coupled to the first common electrode 81*a* on the lower surface of the actuator plate 54. The lower-surface patterned interconnection 81*c* extends from the −Y-side end portion in the first common electrode 81*a* toward the +X side. The +X-side end portion in the lower-surface patterned interconnection 81*c* extends to a position overlapping a central portion in the X direction in the partition wall 62*a* when viewed from the Z direction.

As shown in FIG. 7, the upper-surface patterned interconnection 81*d* is coupled to the second common electrodes 81*b* in a lump on the upper surface of the actuator plate 54. The upper-surface patterned interconnection 81*d* extends in the X direction in a state of being coupled to the −Y-side end portion in each of the second common electrodes 81*b*. The +X-side end portion in the upper-surface patterned interconnection 81*d* extends to a position overlapping the central portion in the X direction in the partition wall 62*a* when viewed from the Z direction.

As shown in FIG. 4, FIG. 6, and FIG. 7, the through interconnection 81*e* couples the lower-surface patterned interconnection 81*c* and the upper-surface patterned interconnection 81*d* to each other. The through interconnection 81*e* is disposed so as to penetrate the actuator plate 54 in the Z direction. Specifically, in the actuator plate 54, an interconnecting through hole 91 is formed in a portion located at the +X side of the +X-side common electrode 81*b*1. In the first embodiment, the interconnecting through hole 91 is formed in a portion overlapping the central portion in the X direction in the partition wall 62*a* out of the actuator plate 54 when viewed from the Z direction. The interconnecting through hole 91 extends in the Y direction along the +X-side common electrode 81*b*1. In the illustrative example, the length in the Y direction of the interconnecting through hole 91 is set to a length slightly longer than the +X-side common electrode 81*b*1, and shorter than the pressure chamber 61. It should be noted that the length in the Y direction of the interconnecting through hole 91 can arbitrarily be changed.

The through interconnection 81*e* is formed on an inner surface of the interconnecting through hole 91. The through interconnection 81*e* is formed at least throughout the entire area in the Z direction on the inner surface of the interconnecting through hole 91. The through interconnection 81*e* is coupled to the lower-surface patterned interconnection 81*c* at a lower-end opening edge of the interconnecting through hole 91 on the one hand, and is coupled to the upper-surface patterned interconnection 81*d* at an upper-end opening edge of the interconnecting through hole 91 on the other hand. It should be noted that the through interconnection 81*e* can be formed throughout the entire circumference in the inner surface of the interconnecting through hole 91.

As shown in FIG. 6, the common coupling interconnection 81*f* couples the through interconnection 81*e* and the common pad 81*g* on the lower surface of the actuator plate 54. Specifically, the common coupling interconnection 81*f* extends in the Y direction at the +Y side of the through interconnection 81*e*. A −Y-side end portion of the common coupling interconnection 81*f* is coupled to the through interconnection 81*e* at the lower-end opening edge of the interconnecting through hole 91. A +Y-side end portion of the common coupling interconnection 81*f* is terminated on the tail part 65.

The common pad 81*g* is coupled to the common coupling interconnection 81*f* on a lower surface of the tail part 65. The common pad 81*g* extends in the X direction on the lower surface of the tail part 65.

As shown in FIG. 6 and FIG. 7, the individual interconnection 82 is provided with first individual electrodes 82*a*, a second individual electrode 82*b*, a lower-surface patterned interconnection 82*c*, an upper-surface patterned interconnection 82*d*, a through interconnection 82*e*, an individual coupling interconnection 82*f*, an individual pad 82*g*, and an inner-surface interconnection 82*h*. It should be noted that it is preferable to dispose an insulator (e.g., $SiO_2$) not shown between the actuator plate 54 and the portions (the lower-surface patterned interconnection 82*c*, the upper-surface patterned interconnection 82*d*, the through interconnection 82*e*, the individual coupling interconnection 82*f*, and the individual pad 82*g*) other than the individual electrodes 82*a*, 82*b* out of the individual interconnection 82.

As shown in FIG. 4 and FIG. 6, the first individual electrodes 82*a* are respectively formed in portions located at both sides in the X direction with respect to the first common electrode 81*a* on the lower surface of the actuator plate 54. The first individual electrodes 82*a* extend in the Y direction in a state of being separated in the X direction from the first common electrode 81*a*. The first individual electrodes 82*a* generate a potential difference from the first common electrode 81*a*. A width D3 in the X direction in the first individual electrode 82*a* is narrower than the width D1 in the X direction in the first common electrode 81*a*.

In the first individual electrodes 82*a*, the whole of the first individual electrode 82*a* (hereinafter referred to as a +X-side individual electrode 82*a*1) located at the +X side overlaps the partition wall 62*a* when viewed from the Z direction. The +X-side individual electrode 82*a*1 is opposed to a part of the +X-side common electrode 81*b*1 in the Z direction on the partition wall 62*a*. In contrast, in the first individual electrodes 82*a*, the whole of the first individual electrode 82*a* (hereinafter referred to as a −X-side individual electrode 82*a*2) located at the −X side overlaps the partition wall 62*b* when viewed from the Z direction. The −X-side individual electrode 82*a*2 is opposed to a part of the −X-side common electrode 81*b*2 in the Z direction on the partition wall 62*b*. The first individual electrodes 82*a* generate a potential difference from the second common electrodes 81*b* opposed thereto in the Z direction.

As shown in FIG. 4 and FIG. 7, the second individual electrode 82*b* is formed in a portion located between the second common electrodes 81*b* on the upper surface of the actuator plate 54. The second individual electrode 82*b* extends in the Y direction in a state of being separated in the X direction from the first common electrode 81*a*. Therefore, the whole of the second individual electrode 82*b* overlaps the corresponding pressure chamber 61 when viewed from the Z direction. The second individual electrode 82*b* generates a potential difference from the second common electrodes 81*b*. At least a part of the second individual electrode 82*b* partially overlaps the first common electrode 81*a* when viewed from the Z direction. Therefore, the second individual electrode 82*b* generates a potential difference from the first common electrode 81*a*. It should be noted that the width in the Y direction in the second individual electrode 82*b* is broader than the width in the Y direction in the second common electrode 81*b*.

As shown in FIG. 6, the lower-surface patterned interconnection 82*c* is coupled to the first individual electrodes 82*a* in a lump on the lower surface of the actuator plate 54. The lower-surface patterned interconnection 82*c* extends in the X direction in a state of being coupled to the +Y-side end portion in each of the first individual electrodes 82*a*. The −X-side end portion in the lower-surface patterned interconnection 82*c* extends to a position overlapping the central portion in the X direction in the partition wall 62*b* when viewed from the Z direction.

As shown in FIG. 7, the upper-surface patterned interconnection 82*d* is coupled to the second individual electrode 82*b* on the upper surface of the actuator plate 54. The upper-surface patterned interconnection 82*d* extends from the +Y-side end portion in the second individual electrode 82*b* toward the −X side. The −X-side end portion in the upper-surface patterned interconnection 82*d* extends to a position overlapping the central portion in the X direction in the partition wall 62*b* when viewed from the Z direction.

As shown in FIG. 4, FIG. 6, and FIG. 7, the through interconnection 82*e* couples the lower-surface patterned interconnection 82*c* and the upper-surface patterned interconnection 82*d* to each other. The through interconnection 82*e* is disposed so as to penetrate the actuator plate 54 in the Z direction. Specifically, in the actuator plate 54, an interconnecting through hole 92 is formed in a portion located at the −X side of the −X-side individual electrode 82*b*2. In the first embodiment, the interconnecting through hole 92 is formed in a portion overlapping the central portion in the X direction in the partition wall 62*b* out of the actuator plate 54 when viewed from the Z direction. In the illustrative example, the length in the Y direction of the interconnecting through hole 92 is set to a length slightly longer than the −X-side individual electrode 82*b*2, and shorter than the pressure chamber 61. It should be noted that the length in the Y direction of the interconnecting through hole 92 can arbitrarily be changed.

On an inner surface of the interconnecting through hole 92, there are formed the through interconnections 82*e* of the pressure chambers 61 adjacent to each other in a state of being separated from each other. In the following description, the through interconnection 82*e* related to the drive interconnection 64A will be described. The through interconnection 82*e* is formed at least throughout the entire area in the Z direction on the inner surface of the interconnecting through hole 92. The through interconnection 82*e* is coupled to the lower-surface patterned interconnection 82*c* at a lower-end opening edge of the interconnecting through hole 92 on the one hand, and is coupled to the upper-surface patterned interconnection 82*d* at an upper-end opening edge of the interconnecting through hole 92 on the other hand. In the illustrative example, the through interconnections 82*e* corresponding to the pressure chambers 61 adjacent to each other are respectively formed on the surfaces opposed to each other in the X direction out of the inner surfaces of the interconnecting through hole 92. Therefore, the through interconnections 82*e* corresponding to the pressure chambers 61 adjacent to each other are segmentalized in the both end portions in the Y direction out of the interconnecting through hole 92.

As shown in FIG. 6, the individual coupling interconnection 82*f* couples the through interconnection 82*e* and the individual pad 82*g* on the lower surface of the actuator plate 54. Specifically, the individual coupling interconnection 82*f* extends toward the +Y side from the through interconnection 82*e*. A −Y-side end portion of the individual coupling interconnection 82*f* is coupled to the through interconnection 82*e* at the lower-end opening edge of the interconnecting through hole 92. A +Y-side end portion of the individual coupling interconnection 82*f* is terminated in a portion located at the +Y side of the common pad 81*g* on the tail part 65.

The individual coupling interconnections 82*f* of the pressure chambers 61 adjacent to each other are adjacent to each other in the X direction on the tail part 65. In a portion of the tail part 65 located between the individual coupling interconnections 82*f* of the pressure chambers 61 adjacent to each other, there is formed an individual separation groove 93. The individual separation groove 93 penetrates the tail part 65 in the Z direction, and at the same time, opens on the +Y-side end surface in the tail part 65.

The individual pad 82*g* is formed in a portion located at the +Y side of the common pad 81*g* on the lower surface of the actuator plate 54. The individual pad 82*g* extends in the X direction on the lower surface of the tail part 65. In the tail part 65, in a portion located between the common pad 81*g* and the individual pad 82*g*, there is formed a common separation groove 94. The common separation groove 94 extends in the X direction with, for example, a length sufficient for straddling the pressure chambers 61 in the tail part 65.

The inner-surface interconnection 82*h* is formed on an inner surface of the individual separation groove 93. The inner-surface interconnections 82*h* of the pressure chambers 61 adjacent to each other are separated in the individual separation groove 93. A dimension in the Z direction in the inner-surface interconnection 82*h* is made larger than the depth of the common separation groove 94. Therefore, the inner-surface interconnection 82*h* continues in the Y direction straddling the common separation groove 94 on the inner surface of the individual separation groove 93. In the inner-surface interconnection 82*h*, a portion located at the −Y side with respect to the common separation groove 94 is coupled to the individual coupling interconnection 82*f* at an opening edge of the individual separation groove 93. In the inner-surface interconnection 82*h*, a portion located at the +Y side with respect to the common separation groove 94 is coupled to the individual coupling interconnection 82*f* (or the individual pad 82*g*) at the opening edge of the individual separation groove 93.

In each of the drive interconnections 64, a portion opposed to the flow channel member 52 is covered with the first film 53. Specifically, in each of the drive interconnections 64, a part of each of the first common electrode 81*a*, the first individual electrodes 82*a*, the lower-surface patterned interconnections 81*c*, 82*c*, the through interconnections 81*e*, 82*e*, and the coupling interconnections 81*f*, 82*f* is covered with the first film 53. In contrast, in the drive interconnection 64, the portions (the common coupling interconnection 81*f*, the individual coupling interconnection 82*f*, the common pad 81*g*, and the individual pad 82*g*) located on the lower surface of the tail part 65 are exposed to the outside.

In the drive interconnection 64, a portion formed on the upper surface of the actuator plate 54 is covered with the second film 55. Specifically, in the drive interconnection 64, the second common electrodes 81*b*, the second individual electrode 82*b*, the upper-surface patterned interconnections 81*d*, 82*d*, and the through interconnections 81*e*, 82*e* are covered with the second film 55.

To the lower surface of the tail part 65, there is pressure-bonded a flexible printed board 95. The flexible printed board 95 is coupled to the common pad 81*g* and the individual pad 82*g* on the lower surface of the tail part 65. The flexible printed board 95 is extracted upward passing through the outside of the actuator plate 54. It should be noted that the common interconnections 81 corresponding to the plurality of pressure chambers 61 are commonalized on the flexible printed board 95.

Operation Method of Printer 1

Then, there will hereinafter be described when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. Further, by the carriage 29 moving in the Y direction at the same time, the inkjet heads 5 mounted on the carriage 29 reciprocate in the Y direction.

While the inkjet heads 5 reciprocate, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the first embodiment, first, by making the pressure pump 24 and the suction pump 25 shown in FIG. 2 operate, the ink is circulated in the circulation flow channel 23. In this case, the ink circulating through the ink supply tube 21 is supplied to the inside of each of the pressure chambers 61 through the entrance common ink chambers 66 and the entrance slits 68. The ink supplied to the inside of each of the pressure chambers 61 circulates through the pressure chamber 61 in the Y direction. Subsequently, the ink is discharged to the exit common ink chambers 67 through the exit slits 69, and is then returned to the ink tank 4 through the ink discharge tube 22. Thus, it is possible to circulate the ink between the inkjet head 5 and the ink tank 4.

Then, when the reciprocation of the inkjet heads 5 is started due to the translation of the carriage 29 (see FIG. 1), the drive voltages are applied between the common electrodes 81*a*, 81*b* and the individual electrodes 82*a*, 82*b* via the flexible printed boards 95. On this occasion, the common electrodes 81*a*, 81*b* are set at a reference potential GND, and the individual electrodes 82*a*, 82*b* are set at a drive potential Vdd to apply the drive voltage.

Figure 8:
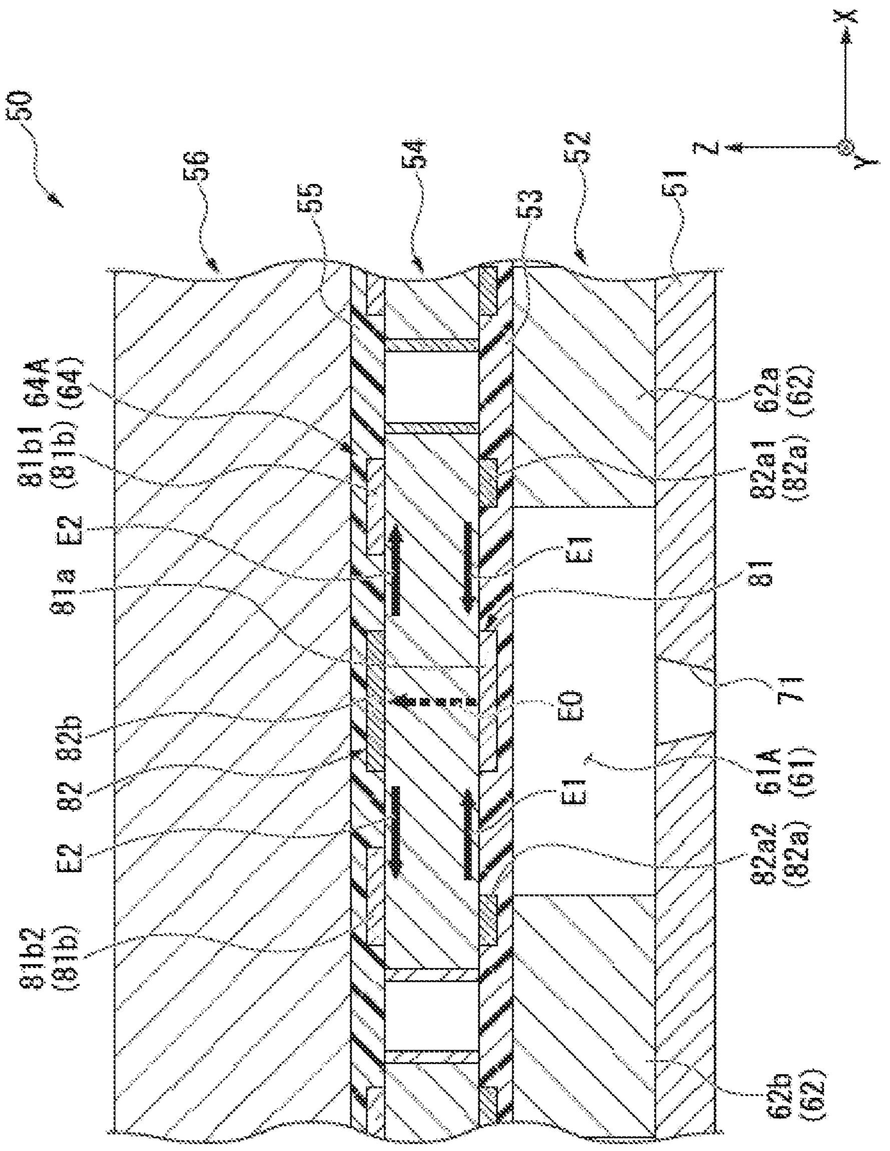
FIG. 8 is an explanatory diagram for explaining a behavior of deformation when ejecting ink regarding the head chip according to the first embodiment.

FIG. 8 is an explanatory diagram for explaining a behavior of deformation when ejecting the ink regarding the head chip 50.

As shown in FIG. 8, due to the application of the drive voltage, the potential difference occurs in the X direction between the first common electrode 81*a* and the first individual electrodes 82*a*, and between the second common electrodes 81*b* and the second individual electrode 82*b*. Due to the potential difference having occurred in the X direction, an electric field occurs in the actuator plate 54 in a direction perpendicular to the polarization direction (the Z direction). As a result, the thickness-shear deformation occurs in the actuator plate 54 in the Z direction due to the shear mode. Specifically, on the lower surface of the actuator plate 54, between the first common electrode 81*a* and the first individual electrodes 82*a*, there occurs the electric field in a direction of coming closer to each other in the X direction (see arrows E1). On the upper surface of the actuator plate 54, between the second common electrodes 81*b* and the second individual electrode 82*b*, there occurs the electric field in a direction of getting away from each other in the X direction (see arrows E2). As a result, in the actuator plate 54, a shear deformation occurs upward as proceeding from the both end portions toward the central portion in the X direction in a portion corresponding to each of the pressure chambers 61. Meanwhile, the potential difference occurs in the Z direction between the first common electrode 81*a* and the second individual electrode 82*b*, and between the first individual electrodes 82*a* and the second common electrodes 81*b*. Due to the potential difference having occurred in the Z direction, an electric field occurs (see an arrow E0) in the actuator plate 54 in a direction parallel to the polarization direction (the Z direction). As a result, a stretch and shrink deformation occurs in the actuator plate 54 in the Z direction due to a bend mode. In other words, in the head chip 50 according to the first embodiment, it results that both of the deformation caused by the shear mode and the deformation caused by the bend mode in the actuator plate 54 occur in the Z direction. Specifically, due to the application of the drive voltage, the actuator plate 54 deforms in a direction of getting away from the pressure chamber 61. Thus, the volume in the pressure chamber 61 increases. Subsequently, when making the drive voltage zero, the actuator plate 54 is restored to thereby urge the volume in the pressure chamber 61 to be restored. In the process in which the actuator plate 54 is restored, the pressure in the pressure chamber 61 increases, and thus, the ink in the pressure chamber 61 is ejected outside through the nozzle hole 71. By the ink ejected outside landing on the recording target medium P, print information is recorded on the recording target medium P.

Method of Manufacturing Head Chip 50

Figure 9:
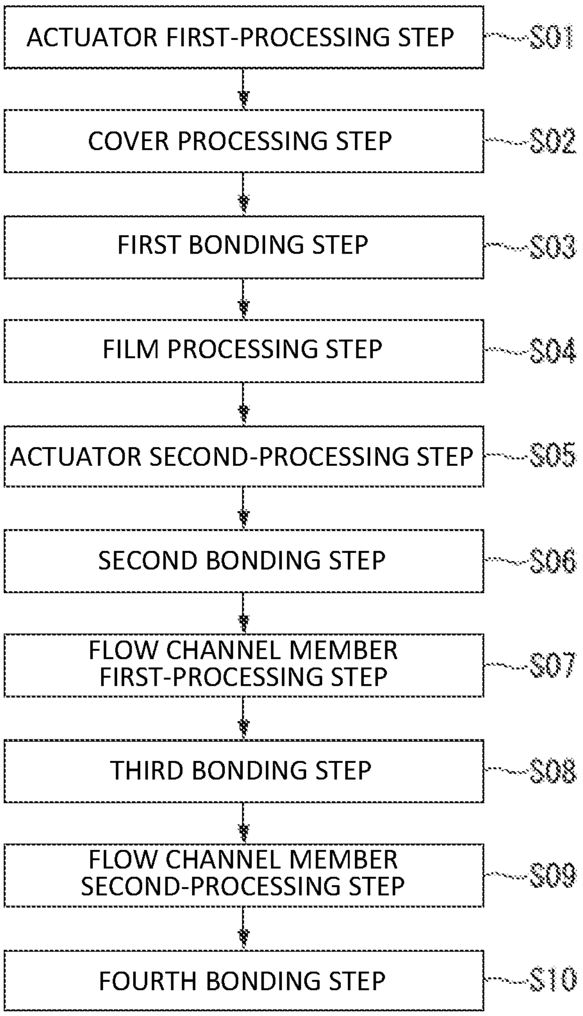
FIG. 9 is a flowchart for explaining a method of manufacturing the head chip according to the first embodiment.

Then, a method of manufacturing the head chip 50 described above will be described. FIG. 9 is a flowchart for explaining the method of manufacturing the head chip 50. FIG. 10 through FIG. 20 are each a diagram for explaining a step of the method of manufacturing the head chip 50, and are each a cross-sectional view corresponding to FIG. 4. In the following description, there is described when manufacturing the head chip 50 chip by chip as an example for the sake of convenience.

As shown in FIG. 9, the method of manufacturing the head chip 50 is provided with an actuator first-processing step S01, a cover processing step S02, a first bonding step S03, a film processing step S04, an actuator second-processing step S05, a second bonding step S06, a flow channel member first-processing step S07, a third bonding step S08, a flow channel member second-processing step S09, and a fourth bonding step S10.

Figure 10:
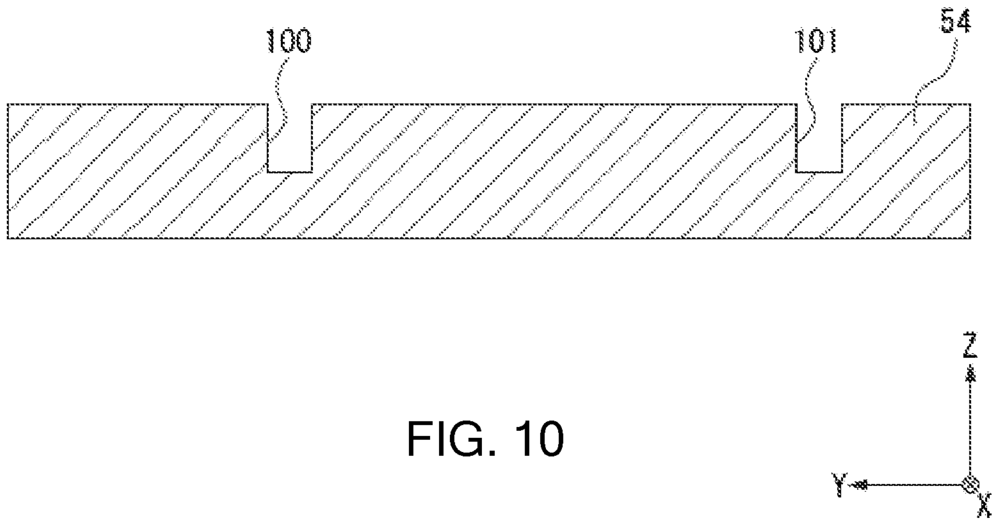
FIG. 10 is a diagram for explaining a step of the method of manufacturing the head chip according to the first embodiment, and is a cross-sectional view corresponding to FIG. 4.

As shown in FIG. 10, in the actuator first-processing step S01, first, slit-forming recessed parts 100, 101 forming a part of the slits 68, 69 are provided to the actuator plate 54 (a slit-forming recessed part formation step). Specifically, a mask pattern in which formation areas of the slits 68, 69 open is formed on the upper surface of the actuator plate 54. Subsequently, sandblasting and so on are performed on the upper surface of the actuator plate 54 through the mask pattern. Thus, the slit-forming recessed parts 100, 101 recessed from the upper surface are provided to the actuator plate 54. It should be noted that the recessed parts 100, 101 can be formed by dicer processing, precision drill processing, etching processing, or the like. Further, it is possible to form the interconnecting through holes 91, 92 and the individual separation grooves 93 at the same time as the slit-forming recessed parts 100, 101.

Figure 11:
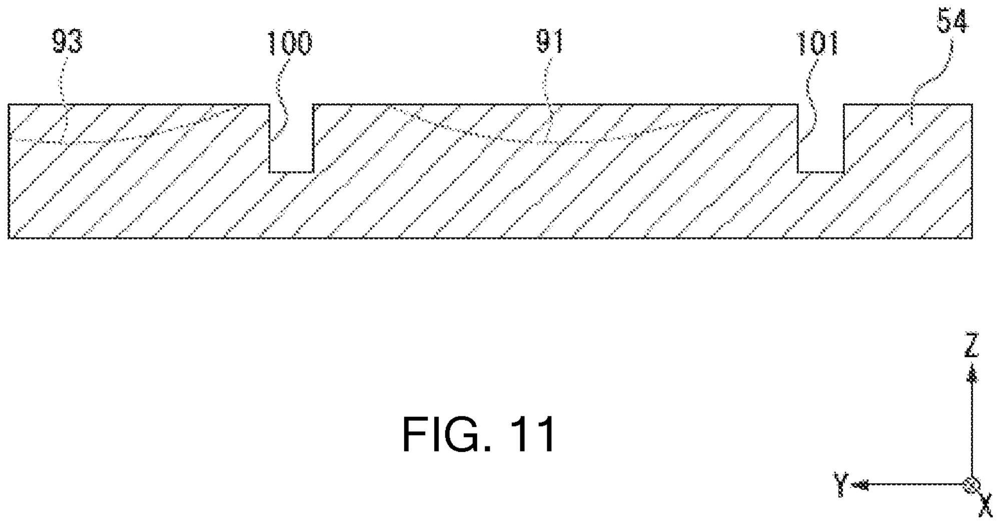
FIG. 11 is a diagram for explaining a step of the method of manufacturing the head chip according to the first embodiment, and is a cross-sectional view corresponding to FIG. 4.

Then, in the actuator first-processing step S01, portions located on the upper surface of the actuator plate 54 out of the drive interconnections 64 are formed (an upper-surface interconnection formation step). In the upper-surface interconnection formation step, first, a mask pattern in which formation areas of the drive interconnections 64 open is formed on the upper surface of the actuator plate 54. Then, as shown in FIG. 11, the interconnecting through holes 91, 92 and the individual separation grooves 93 are provided to the actuator plate 54. Formation of the interconnecting through holes 91, 92 and the individual separation grooves 93 is performed by making a dicer enter the actuator plate 54 from, for example, the upper surface side. Then, an electrode material is deposited on the actuator plate 54 using, for example, vapor deposition. The electrode material is deposited on the actuator plate 54 through the mask pattern. Thus, the drive interconnections 64 are formed on the upper surface of the actuator plate 54, the inner surfaces of the interconnecting through holes 91, 92, and the inner surfaces of the individual separation grooves 93.

Figure 12:
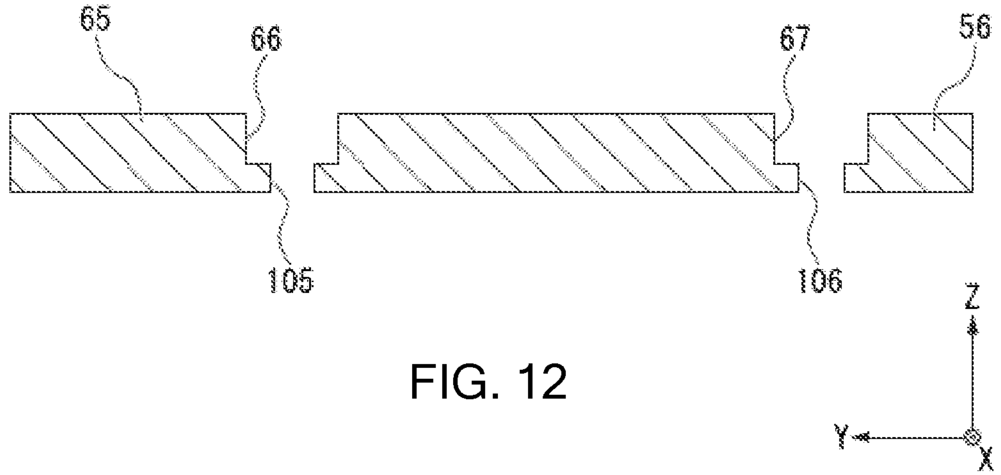
FIG. 12 is a diagram for explaining a step of the method of manufacturing the head chip according to the first embodiment, and is a cross-sectional view corresponding to FIG. 4.

As shown in FIG. 12, in the cover processing step S02, the common ink chambers 66, 67, and slit-forming recessed parts 105, 106 to be a part of the slits 68, 69 are provided to the cover plate 56. Specifically, a mask pattern in which portions located in formation areas of the common ink chambers 66, 67 open is formed on the upper surface of the actuator plate 54. Meanwhile, a mask pattern in which formation areas of the slits 68, 69 open is formed on the lower surface of the actuator plate 54. Subsequently, sandblasting and so on are performed on the both surfaces of the actuator plate 54 through the mask patterns. Thus, the common ink chambers 66, 67 and the slit-forming recessed parts 105, 106 are provided to the actuator plate 54.

Figure 13:
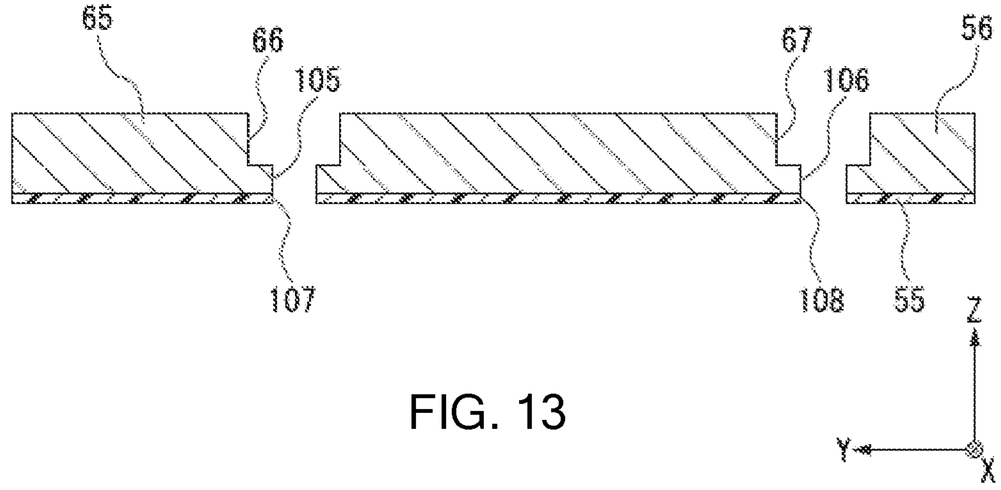
FIG. 13 is a diagram for explaining a step of the method of manufacturing the head chip according to the first embodiment, and is a cross-sectional view corresponding to FIG. 4.

As shown in FIG. 13, in the first bonding step S03, the second film 55 is attached to a lower surface of the cover plate 56 with an adhesive or the like.

In the film processing step S04, slit-forming recessed parts 107, 108 to be a part of the slits 68, 69 are provided to the second film 55. It is possible to form the slit-forming recessed parts 107, 108 by performing, for example, laser processing on portions overlapping the corresponding slit-forming recessed parts 105, 106 when viewed from the Z direction out of the second film 55. Thus, the slit-forming recessed parts 105, 107 are communicated with each other, and the slit-forming recessed parts 106, 108 are communicated with each other.

Figure 14:
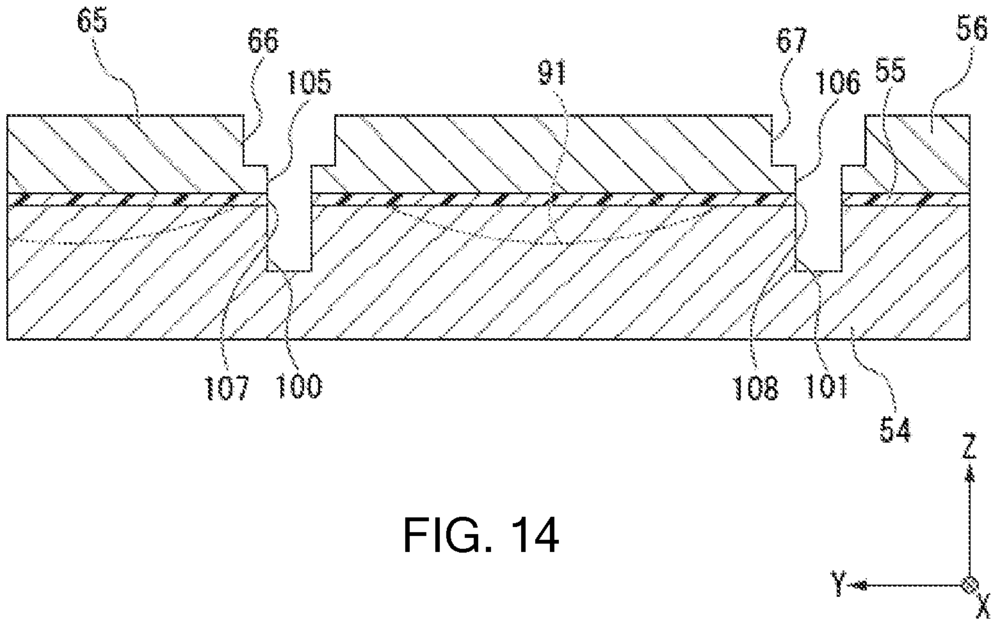
FIG. 14 is a diagram for explaining a step of the method of manufacturing the head chip according to the first embodiment, and is a cross-sectional view corresponding to FIG. 4.

As shown in FIG. 14, in the second bonding step S06, the actuator plate 54 is attached to a lower surface of the second film 55 with an adhesive or the like.

Figure 15:
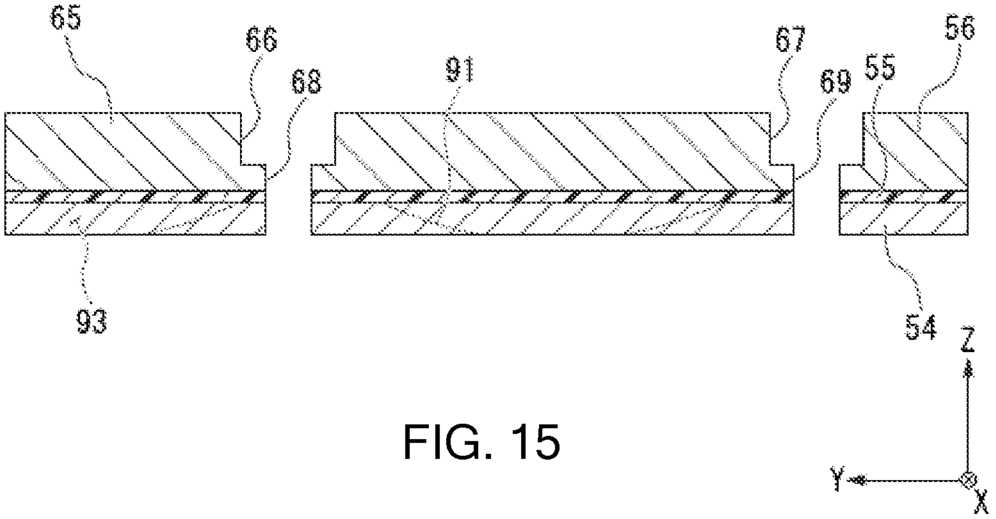
FIG. 15 is a diagram for explaining a step of the method of manufacturing the head chip according to the first embodiment, and is a cross-sectional view corresponding to FIG. 4.

As shown in FIG. 15, in the actuator second-processing step S05, grinding processing is performed on the lower surface of the actuator plate 54 (a grinding step). On this occasion, on the lower surface of the actuator plate 54, the actuator plate 54 is ground up to a position where the interconnecting through holes 91, 92 and the individual separation grooves 93 open.

Then, in the actuator second-processing step S05, portions located on the lower surface of the actuator plate 54 out of the drive interconnections 64 are formed (a lower-surface interconnection formation step). In the lower-surface interconnection formation step, first, a mask pattern in which formation areas of the drive interconnections 64 open is formed on the lower surface of the actuator plate 54. Subsequently, an electrode material is deposited on the actuator plate 54 using, for example, vapor deposition. The electrode material is deposited on the actuator plate 54 through the mask pattern. Thus, the drive interconnections 64 are formed on the lower surface of the actuator plate 54, the inner surfaces of the interconnecting through holes 91, 92, and the inner surfaces of the individual separation grooves 93.

Figure 16:
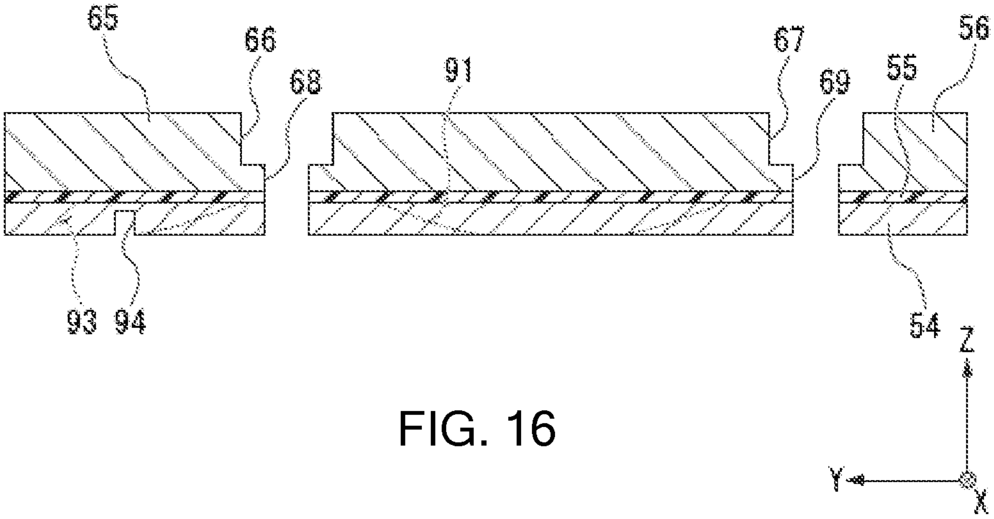
FIG. 16 is a diagram for explaining a step of the method of manufacturing the head chip according to the first embodiment, and is a cross-sectional view corresponding to FIG. 4.

As shown in FIG. 16, in the actuator second-processing step S05, the common separation grooves 94 are provided to the tail part 65. Formation of the common separation grooves 94 is performed by making a dicer enter the actuator plate 54 from, for example, the lower surface side.

Figure 17:
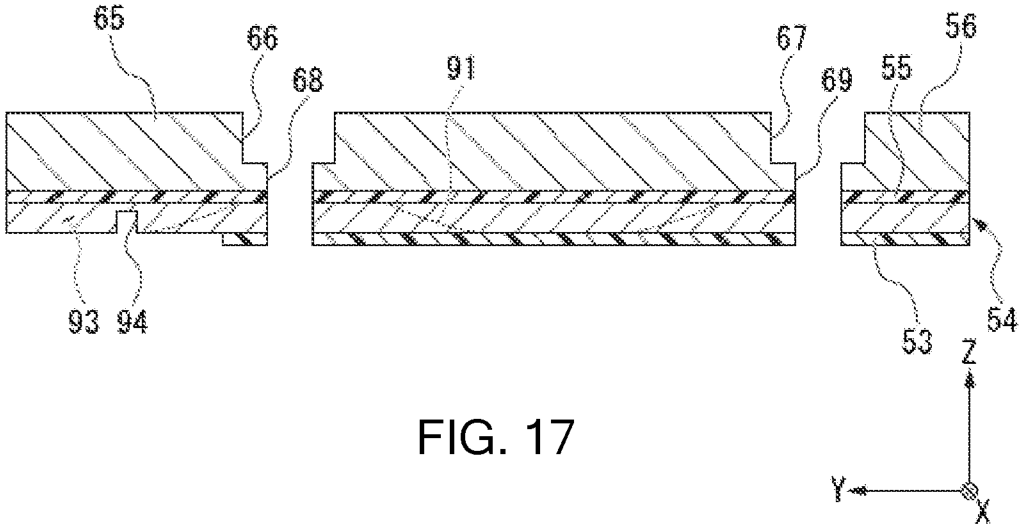
FIG. 17 is a diagram for explaining a step of the method of manufacturing the head chip according to the first embodiment, and is a cross-sectional view corresponding to FIG. 4.

As shown in FIG. 17, in the second bonding step S06, the first film 53 is attached to the lower surface of the actuator plate 54 with an adhesive or the like.

Figure 18:
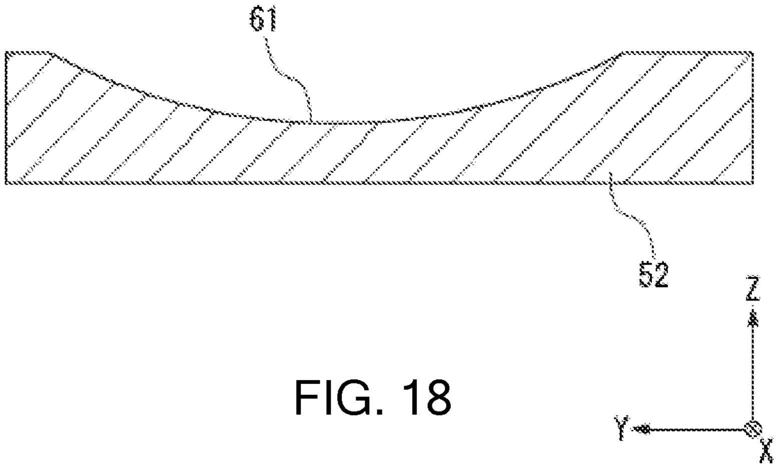
FIG. 18 is a diagram for explaining a step of the method of manufacturing the head chip according to the first embodiment, and is a cross-sectional view corresponding to FIG. 4.

As shown in FIG. 18, in the flow channel member first-processing step S07, the pressure chambers 61 are provided to the flow channel member 52. Specifically, the formation is performed by making a dicer enter the flow channel member 52 from, for example, the upper surface side.

Figure 19:
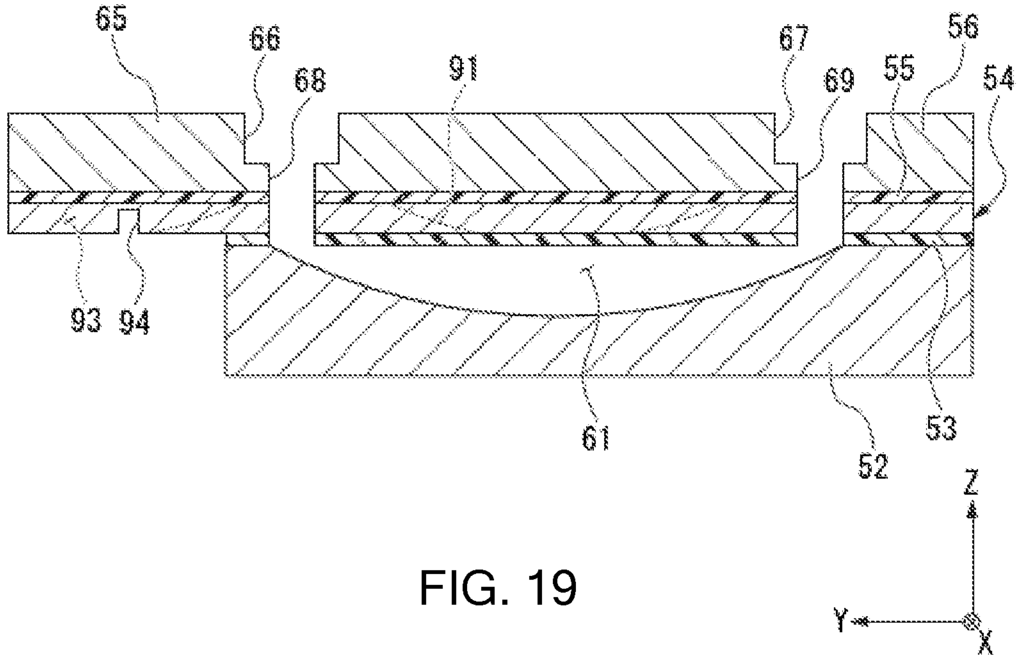
FIG. 19 is a diagram for explaining a step of the method of manufacturing the head chip according to the first embodiment, and is a cross-sectional view corresponding to FIG. 4.

As shown in FIG. 19, in the third bonding step S08, the flow channel member 52 is attached to the lower surface of the first film 53 with an adhesive or the like.

Figure 20:
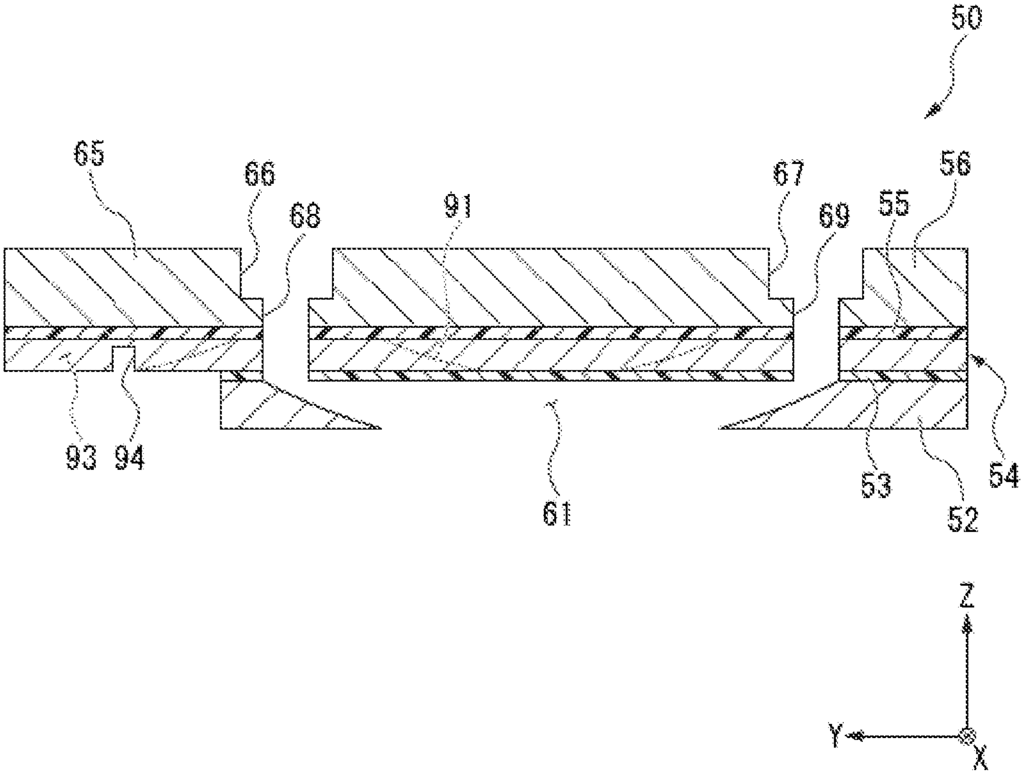
FIG. 20 is a diagram for explaining a step of the method of manufacturing the head chip according to the first embodiment, and is a cross-sectional view corresponding to FIG. 4.

As shown in FIG. 20, in the flow channel member second-processing step S09, grinding processing is performed on the lower surface of the flow channel member 52 (a grinding step). On this occasion, on the lower surface of the flow channel member 52, the flow channel member 52 is ground up to a position where the pressure chambers 61 open.

In the fourth bonding step S10, the nozzle plate 51 is attached to the lower surface of the flow channel member 52 in a state in which the nozzle holes 71 and the pressure chambers 61 are aligned with each other.

Due to the steps described hereinabove, the head chip 50 is completed.

Here, in the first embodiment, there is adopted the configuration provided with the first common electrode (a first electrode, a drive electrode) 81*a* disposed on the lower surface (a first surface) of the actuator plate 54 so as to overlap the pressure chamber 61 when viewed from the Z direction (a first direction), the first individual electrodes 82*a* (second electrodes, the drive electrodes) which are disposed on the lower surface of the actuator plate 54 so as to be adjacent to the first common electrode 81*a*, and which generate the potential difference from the first common electrode 81*a*, and the second individual electrode 82*b* (a first opposed electrode, the drive electrode) which is individually disposed at the position opposed to the first common electrode 81*a* on the upper surface (a second surface) of the actuator plate 54, and which generates the potential difference from the first common electrode 81*a*.

According to this configuration, by generating the potential difference between the first common electrode 81*a* and the first individual electrodes 82*a*, it is possible to generate the electric field in the direction (the X direction) crossing the polarization direction of the actuator plate 54. Thus, by deforming the actuator plate 54 in the Z direction in the shear mode (the roof-shoot type), it is possible to change the volume of the pressure chamber 61.

Further, in the first embodiment, by generating the potential difference between the first common electrode 81*a* and the second individual electrode 82*b*, it is possible to generate the electric field also in the polarization direction of the actuator plate 54. Thus, by deforming the actuator plate 54 in the Z direction in the bend mode (a bimorph type), it is possible to change the volume of the pressure chamber 61.

By deforming the actuator plate 54 in the Z direction in both of the drive modes, namely the shear mode and the bend mode, as described above, it is possible to increase the pressure to be generated in the pressure chamber 61 to thereby achieve the power saving. It should be noted that in the first embodiment, by adopting the head chip 50 of the roof-shoot type in the shear mode, it is possible to provide the pressure chambers 61 to a separated member (the flow channel member 52) from the actuator plate 54 unlike the head chip of the wall-bend type. Thus, it is possible for the head chip 50 of the roof-shoot type to prevent the ink in the pressure chamber 61 from adhering to the interconnections 81, 82 even when the bonding between the first film 53 and the flow channel member 52 is supposedly insufficient. As a result, it is easy for the head chip 50 of the roof-shoot type to increase the durability compared to the head chip of the wall-bend type.

In particular, in the first embodiment, since the second individual electrodes 82*b* are individually disposed so as to correspond to the first common electrodes 81*a*, it results that the second individual electrodes 82*b* are disposed on the upper surface of the actuator plate 54 at intervals. Therefore, it is possible to decrease the capacitance of the actuator plate 54 compared to when, for example, the second individual electrode 82*b* is formed throughout the entire area of the upper surface of the actuator plate 54. As a result, it is possible to improve a response characteristic of the actuator plate 54, and at the same time, it is possible to suppress the heat generation in the actuator plate 54.

The head chip 50 according to the first embodiment is provided with the second common electrodes (second opposed electrodes, the drive electrodes) 81*b* which are disposed so as to be opposed to the first individual electrodes 82*a* on the upper surface of the actuator plate 54, and so as to be adjacent to the second individual electrode 82*b*. There is adopted the configuration in which the second common electrodes 81*b* generate the potential difference in the Z direction from the first individual electrodes 82*a*, and at the same time, generate the potential difference in the X direction from the second individual electrode 82*b*.

According to this configuration, the second common electrodes 81*b* and the second individual electrode 82*b* are disposed on the upper surface of the actuator plate 54 so as to be adjacent to each other. Therefore, it is possible to deform the actuator plate 54 in the shear mode due to the potential difference generated between the second common electrodes 81*b* and the second individual electrode 82*b*.

Further, it is possible to deform the actuator plate 54 in the bend mode due to the potential difference generated between the first individual electrodes 82*a* and the second common electrodes 81*b*. As a result, it is possible to achieve a further increase in pressure to be generated, and the power saving.

In the first embodiment, there is adopted the configuration in which the whole of the first individual electrode 82*a* is disposed at the position overlapping the partition wall 62 when viewed from the Z direction.

According to this configuration, since the first individual electrode 82*a* is not formed in a portion of the lower surface of the actuator plate 54, the portion being opposed to the pressure chamber 61, it is easy to ensure the area of the electrode (the first common electrode 81*a*) formed in the portion opposed to the pressure chamber 61. As a result, it is easy to ensure the electric field to be generated in the actuator plate 54 due to the first common electrode 81*a*, and thus, it is easy to increase the pressure to be generated in the pressure chamber 61.

Further, since the first individual electrode 82*a* is not formed in the portion of the lower surface of the actuator plate 54, the portion being opposed to the pressure chamber 61, it is possible to prevent the deformation of the actuator plate 54 from being hindered by the first individual electrode 82*a* when the portion of the actuator plate 54 opposed to the pressure chamber 61 deforms. In other words, since it is possible to spread the starting point of the deformation of the actuator plate 54 up to the boundary portion between the actuator plate 54 and the partition wall 62, it is possible to ensure the deformation amount of the actuator plate 54 to increase the pressure to be generated.

In the first embodiment, there is adopted the configuration in which a part of the second common electrode 81*b* is disposed so as to be opposed to the first individual electrode 82*a* at the position overlapping the partition wall 62 when viewed from the Z direction, and a remaining part thereof is disposed so as to be opposed to the pressure chamber 61.

According to this configuration, in the state in which a part of the second common electrode 81*b* is opposed to the first individual electrode 82*a*, a remaining part is made to extend up to the position overlapping the pressure chamber 61. Thus, when the actuator plate 54 deforms in the bend mode, the electric field to be generated in the actuator plate 54 due to the potential difference between the second common electrodes 81*b* and the first individual electrodes 82*a* can effectively be generated in a portion of the actuator plate 54, the portion being opposed to the pressure chamber 61. Further, since it is possible to make the second common electrodes 81*b* and the second individual electrode 82*b* close to each other, when the actuator plate 54 deforms in the shear mode, the electric field to be generated in the actuator plate 54 due to the potential difference between the second common electrodes 81*b* and the second individual electrode 82*b* can effectively be generated in the portion of the actuator plate 54, the portion being opposed to the pressure chamber 61.

As a result, it is possible to efficiently deform the actuator plate 54.

In the first embodiment, there is adopted the configuration in which the whole of the first common electrode 81*a* and the second individual electrode 82*b* is disposed at the position opposed in the Z direction to the pressure chamber 61.

According to this configuration, when the actuator plate 54 deforms in the bend mode, the electric field to be generated in the actuator plate 54 due to the potential difference between the first common electrode 81*a* and the second individual electrode 82*b* can effectively be generated in the portion of the actuator plate 54, the portion being opposed to the pressure chamber 61. Therefore, it is possible to efficiently deform the actuator plate 54.

In the first embodiment, there is adopted the configuration in which the cover plate 56 (a regulating member) for regulating the displacement of the actuator plate 54 toward the opposite side in the Z direction to the flow channel member 52 is stacked at the opposite side to the flow channel member 52 across the actuator plate 54.

According to this configuration, it is possible to regulate the upward displacement of the actuator plate 54 with respect to the resistive force (compliance) of the ink acting on the actuator plate 54 due to, for example, the pressure of the ink in the pressure chamber 61 using the cover plate 56. Thus, it is possible to effectively propagate the deformation of the actuator plate 54 toward the pressure chamber 61. As a result, it is possible to increase the pressure to be generated in the pressure chamber 61 when deforming the actuator plate 54 to thereby achieve the power saving.

According to the inkjet head 5 and the printer 1 related to the first embodiment, since there is provided the head chip 50 described above, it is possible to provide the inkjet head 5 and the printer 1 which are power-saving and high-performance.

Second Embodiment

Figure 21:
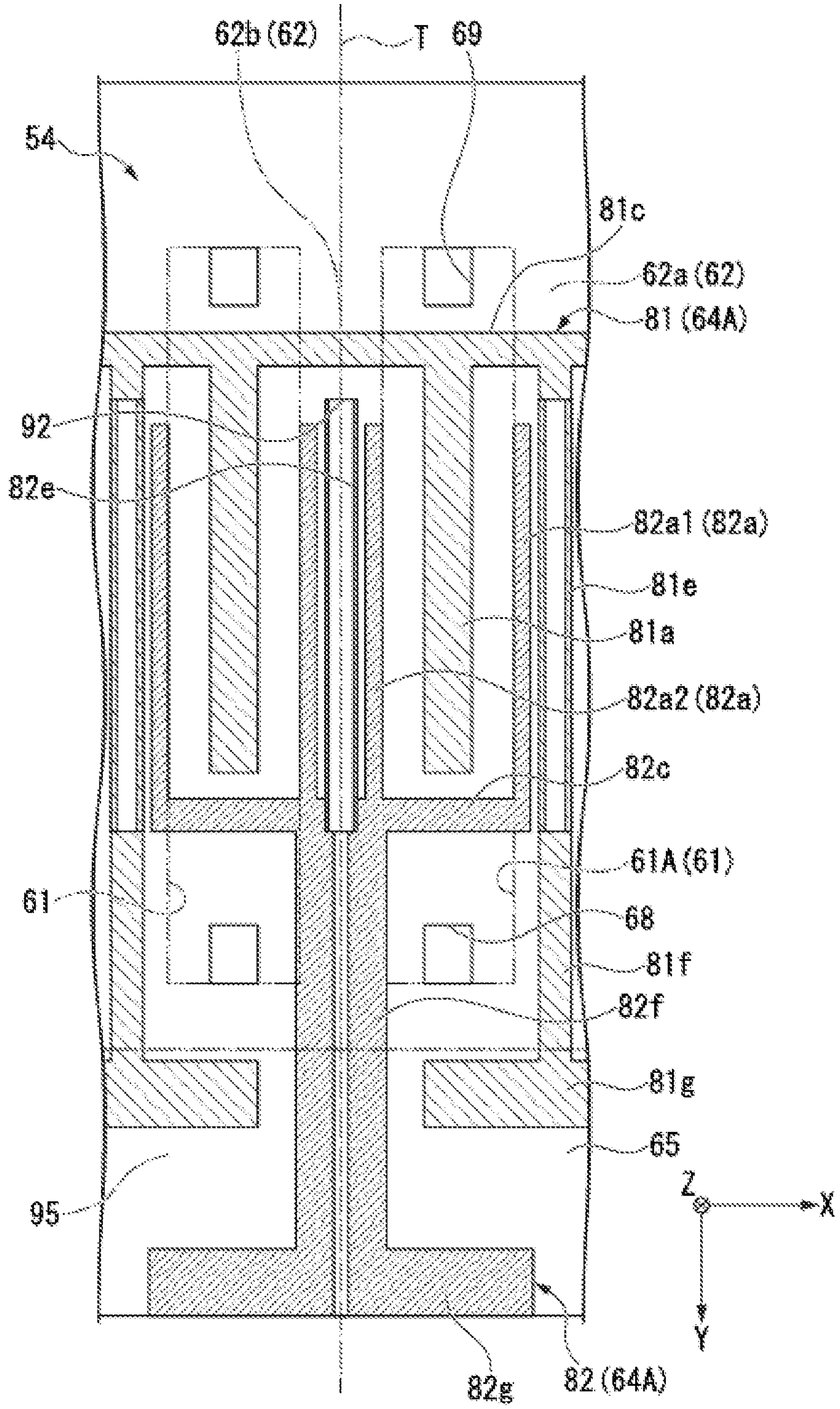
FIG. 21 is a bottom view of an actuator plate related to a second embodiment.
Figure 22:
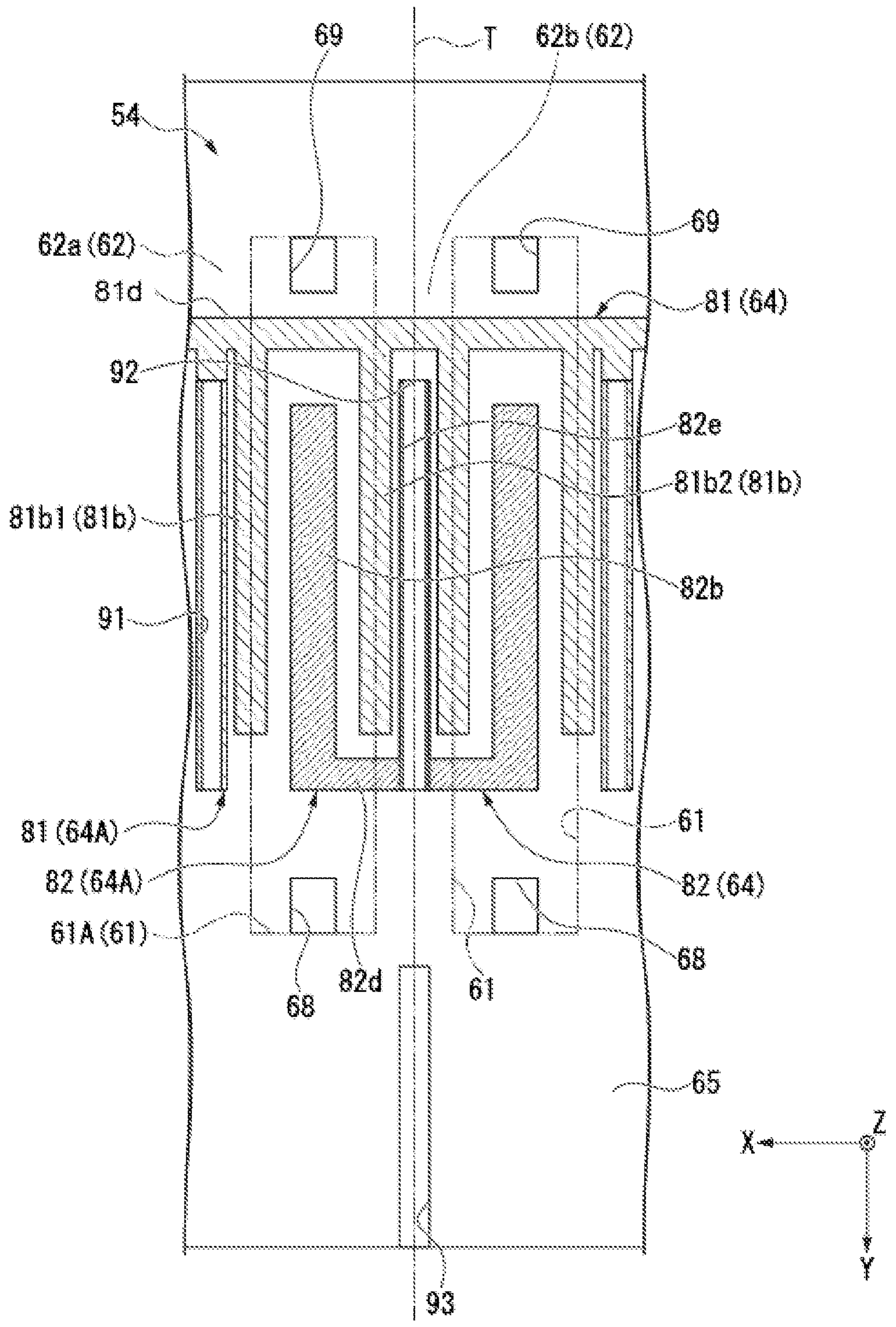
FIG. 22 is a plan view of the actuator plate related to the second embodiment.

FIG. 21 is a bottom view of an actuator plate 54 related to a second embodiment. FIG. 22 is a plan view of the actuator plate 54 related to the second embodiment. The second embodiment is different from the first embodiment described above in the layout of the drive interconnections 64.

In the head chip 50 shown in FIG. 21, the common interconnections 81 corresponding respectively to the pressure chambers 61 are commonalized on the actuator plate 54. Specifically, the lower-surface patterned interconnections 81*c* corresponding respectively to the pressure chambers 61 are coupled to each other at the −Y side of the first common electrodes 81*a*. In contrast, as shown in FIG. 22, the upper-surface patterned interconnections 81*d* corresponding respectively to the pressure chambers 61 are coupled to each other at the −Y side of the second common electrodes 81*b*.

Further, in the first embodiment described above, there is described the configuration in which the individual separation groove 93 and the common separation groove 94 are provided to the tail part 65, but this configuration is not a limitation. Providing the insulation between the common interconnections 81 and the individual interconnections 82 is achieved in the configuration, it is not required to dispose the individual separation groove 93 and the common separation groove 94. In this case, it is possible to divide the coupling interconnections 81*f*, 82*f* from each other with laser processing or the like after, for example, the lower-surface interconnection formation step.

Third Embodiment

Figure 23:
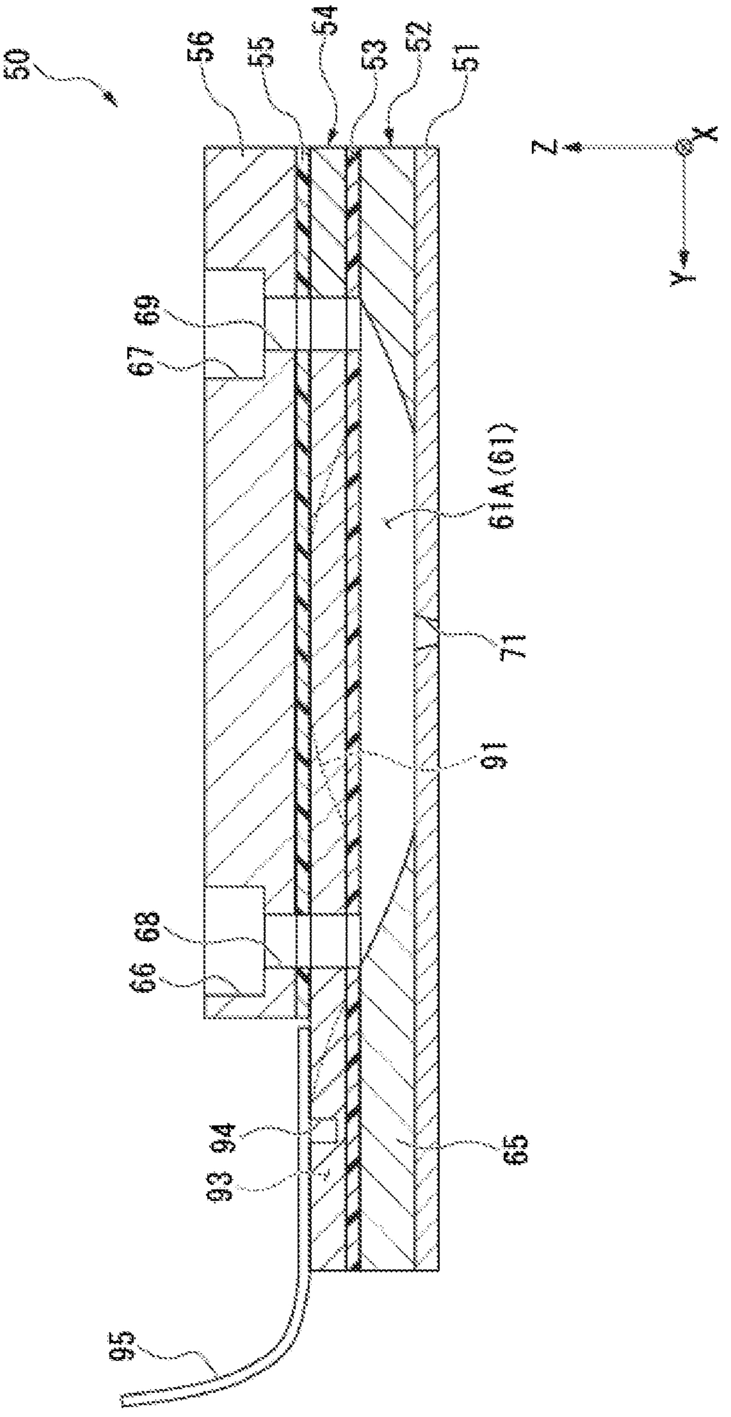
FIG. 23 is a cross-sectional view of a head chip according to a third embodiment.

FIG. 23 is a cross-sectional view of a head chip 50 according to a third embodiment. The third embodiment is different from each of the embodiments described above in the point that the flexible printed board 95 is extracted from an upper surface of the tail part 65.

In the head chip 50 shown in FIG. 23, the nozzle plate 51, the flow channel member 52, the first film 53, and the actuator plate 54 project toward the +Y side from the second film 55 and the cover plate 56. Portions projecting toward the +Y side from the cover plate 56 in the nozzle plate 51, the flow channel member 52, the first film 53, and the actuator plate 54 constitute a tail part 65 in the third embodiment. It should be noted that regarding the drive interconnections 64, it is possible to adopt substantially the same configuration as in the first embodiment and the second embodiment except the point that the coupling interconnections 81*f*, 82*f* and the pads 81*g*, 82*g* are formed on the upper surface of the actuator plate 54.

To the upper surface of the tail part 65, there is pressure-bonded the flexible printed board 95. The flexible printed board 95 is coupled to the common pad 81*g* and the individual pad 82*g* on the upper surface of the tail part 65. The flexible printed board 95 is extracted upward from the upper surface of the tail part 65.

In the third embodiment, it is possible to extract the flexible printed board 95 above the tail part 65. Therefore, it is possible to narrow the distance between the head chips 50 (between the nozzle holes 71) adjacent to each other when arranging the plurality of head chips 50 compared to when extracting the flexible printed board 95 upward after detouring it around a lateral side of the head chip 50. As a result, it is possible to achieve the reduction in size and so on of the inkjet head 5.

Fourth Embodiment

In the embodiments described above, there is described the configuration in which the first common electrode 81*a* is arranged at the position opposed to the corresponding pressure chamber 61, and the first individual electrodes 82*a* are arranged at the positions opposed to the respective partition walls 62 on the lower surface of the actuator plate 54.

Figure 24:
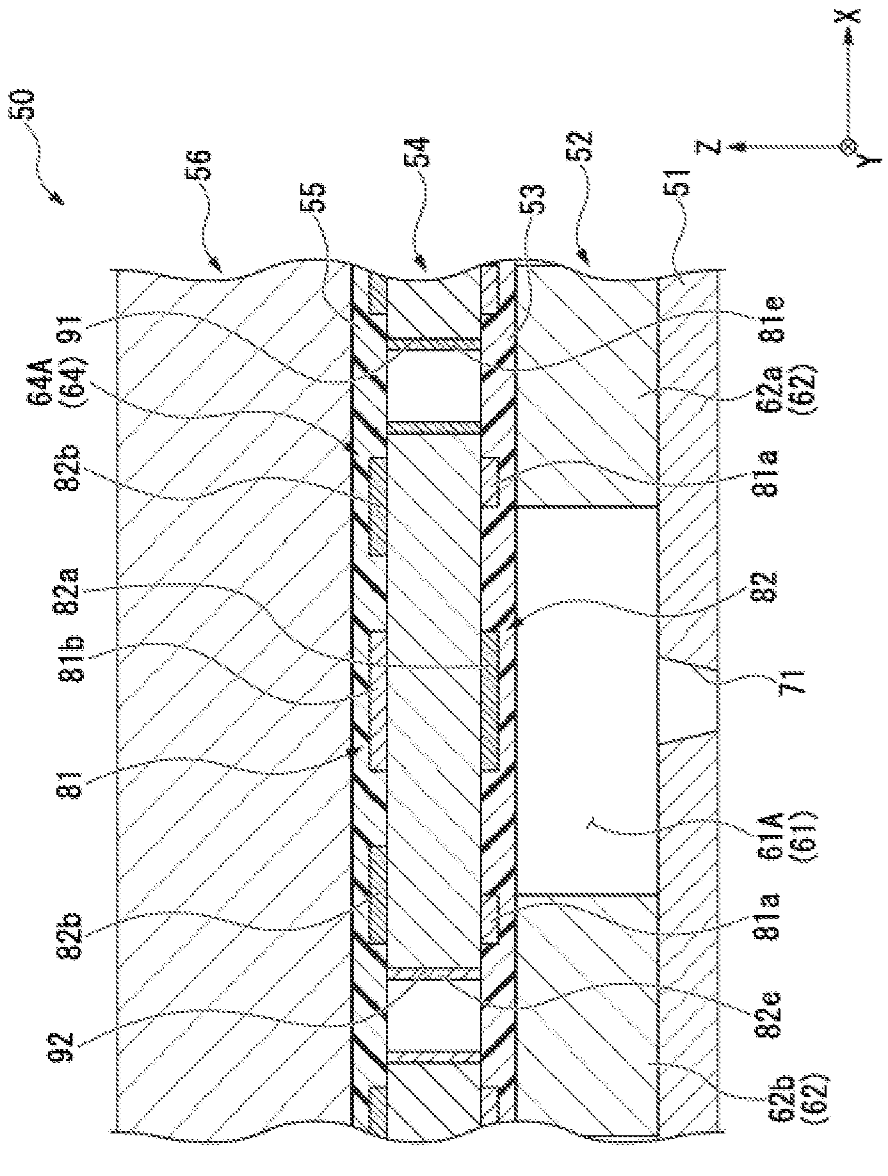
FIG. 24 is a cross-sectional view of a head chip according to a fourth embodiment.

In contrast, in the fourth embodiment, as shown in FIG. 24, the first individual electrode 82*a* is arranged at the position opposed to the corresponding pressure chamber 61, and the first common electrodes 81*a* are arranged at the positions opposed to the respective partition walls 62 on the lower surface of the actuator plate 54. In other words, on the lower surface of the actuator plate 54, the first individual electrode 82*a* and the first common electrodes 81*a* are arranged so as to be adjacent to each other.

In contrast, the second common electrode 81*b* is arranged at the position opposed to the corresponding pressure chamber 61, and the second individual electrodes 82*b* are arranged at the positions opposed to the respective partition walls 62 on the upper surface of the actuator plate 54. In other words, on the upper surface of the actuator plate 54, the second individual electrodes 82*b* and the second common electrode 81*b* are arranged so as to be adjacent to each other. Further, the first individual electrode 82*a* and the second common electrode 81*b* are opposed to each other in the Z direction at the position overlapping the pressure chamber 61 when viewed from the Z direction. The first common electrodes 81*a* and the second individual electrodes 82*b* are opposed to each other in the Z direction at the positions overlapping the partition walls 62 when viewed from the Z direction. It should be noted that in the fourth embodiment, the patterning of the interconnections between the electrodes 81*a*, 81*b*, 82*a*, and 82*b* and the pads 81*g*, 82*g* can be realized by appropriately changing, for example, the configuration of the first embodiment described above.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z direction coincides with the gravitational direction, but this configuration is not a limitation, and it is also possible to set the Z direction to a direction along the horizontal direction.

In the embodiments described above, the description is presented citing the head chip 50 of the recirculating side-shoot type as an example, but this configuration is not a limitation. The head chip can be of a so-called edge-shoot type for ejecting the ink from an end portion in the extending direction (the Y direction) of the pressure chamber 61.

In the embodiments described above, there is described when arranging that the potential difference occurs between the electrodes formed on one surface of the actuator plate 54 and the electrodes formed on the other surface, but this configuration is not a limitation. As shown in, for example, FIG. 25, it is possible to adopt a configuration in which the first common electrode 81*a* and the first individual electrodes 82*a* are formed on the lower surface (the first surface) of the actuator plate 54 on the one hand, and only the second individual electrode 82*b* is formed at a position opposed to the first common electrode 81*a* in the upper surface (the second surface) of the actuator plate 54 on the other hand. Further, as shown in FIG. 26, it is possible to adopt a configuration in which the second common electrodes 81*b* and the second individual electrode 82*b* are formed on the upper surface (the first surface) of the actuator plate 54 on the one hand, and only the first common electrode 81*a* is formed at a position opposed to the second individual electrode 82*b* in the lower surface (the second surface) of the actuator plate 54 on the other hand.

Figure 25:
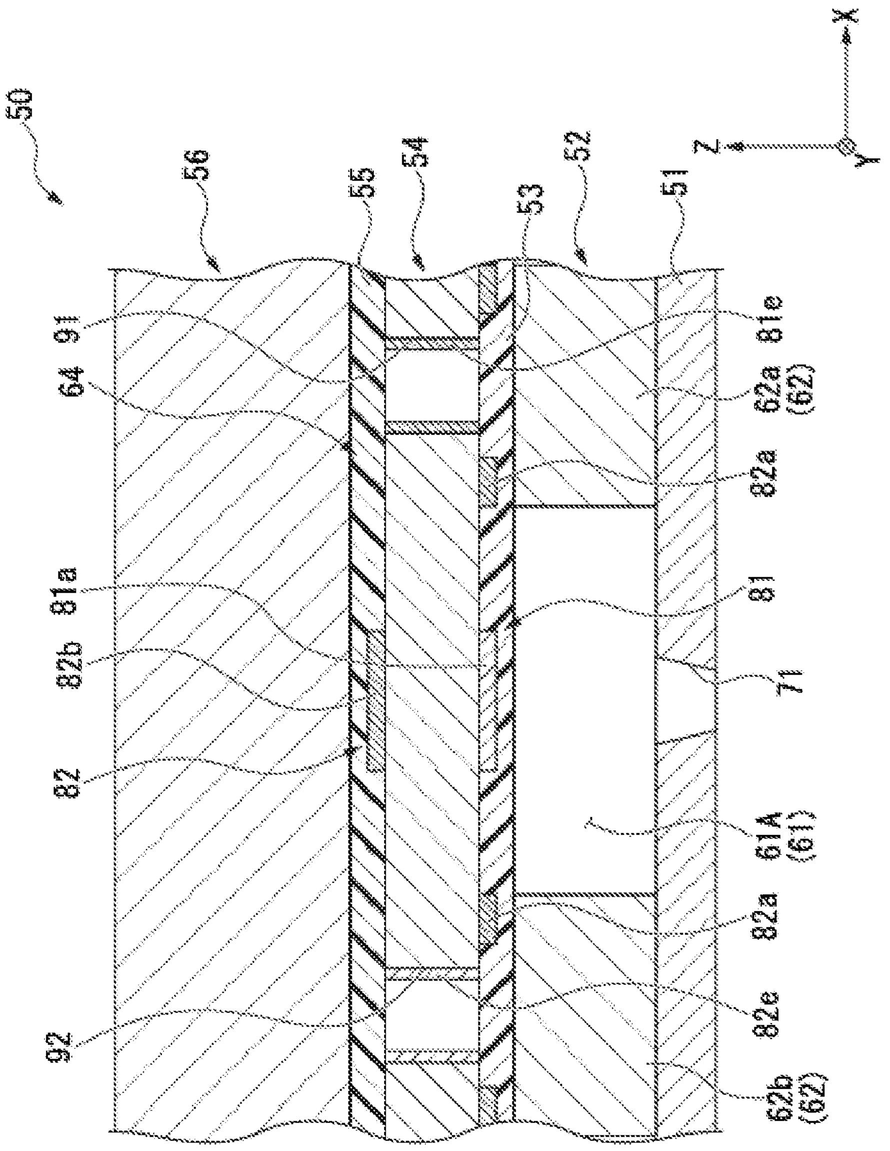
FIG. 25 is a cross-sectional view of a head chip according to a modified example.
Figure 26:
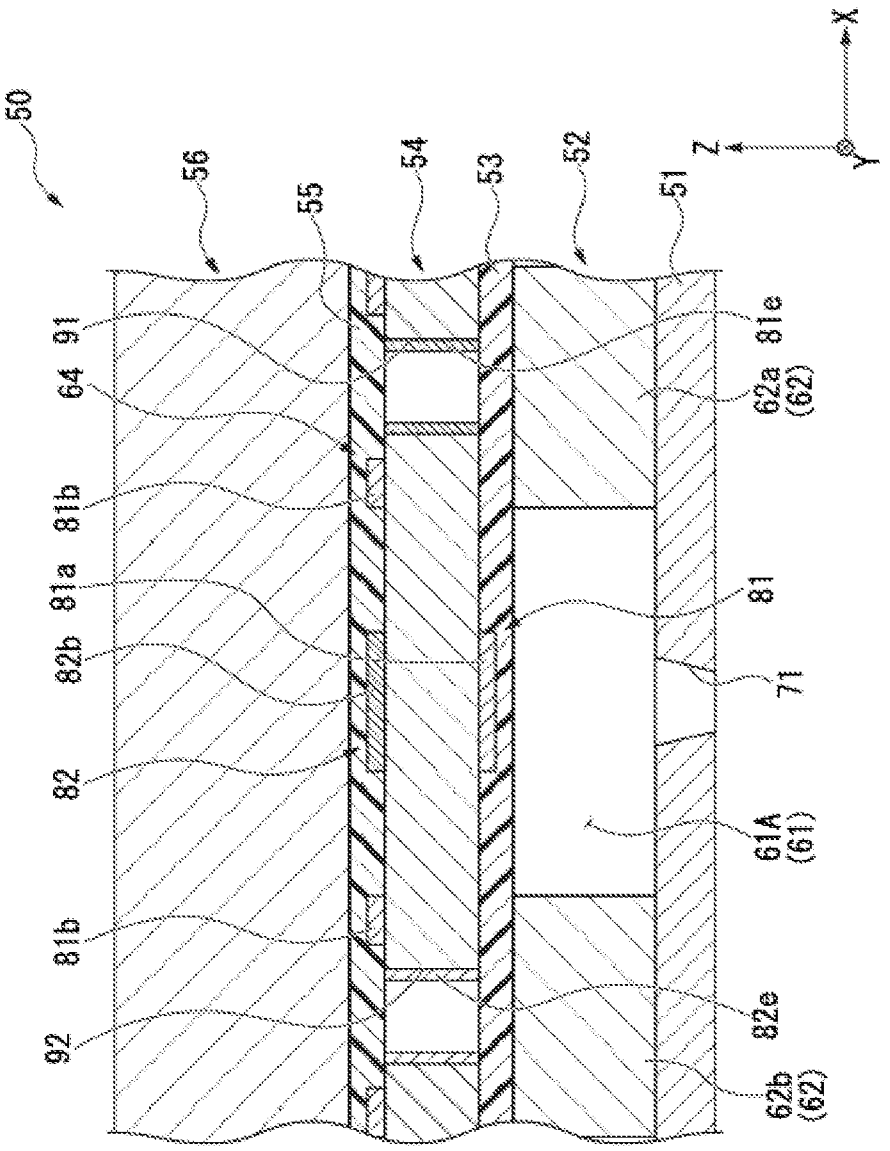
FIG. 26 is a cross-sectional view of a head chip according to a modified example.
Figure 27:
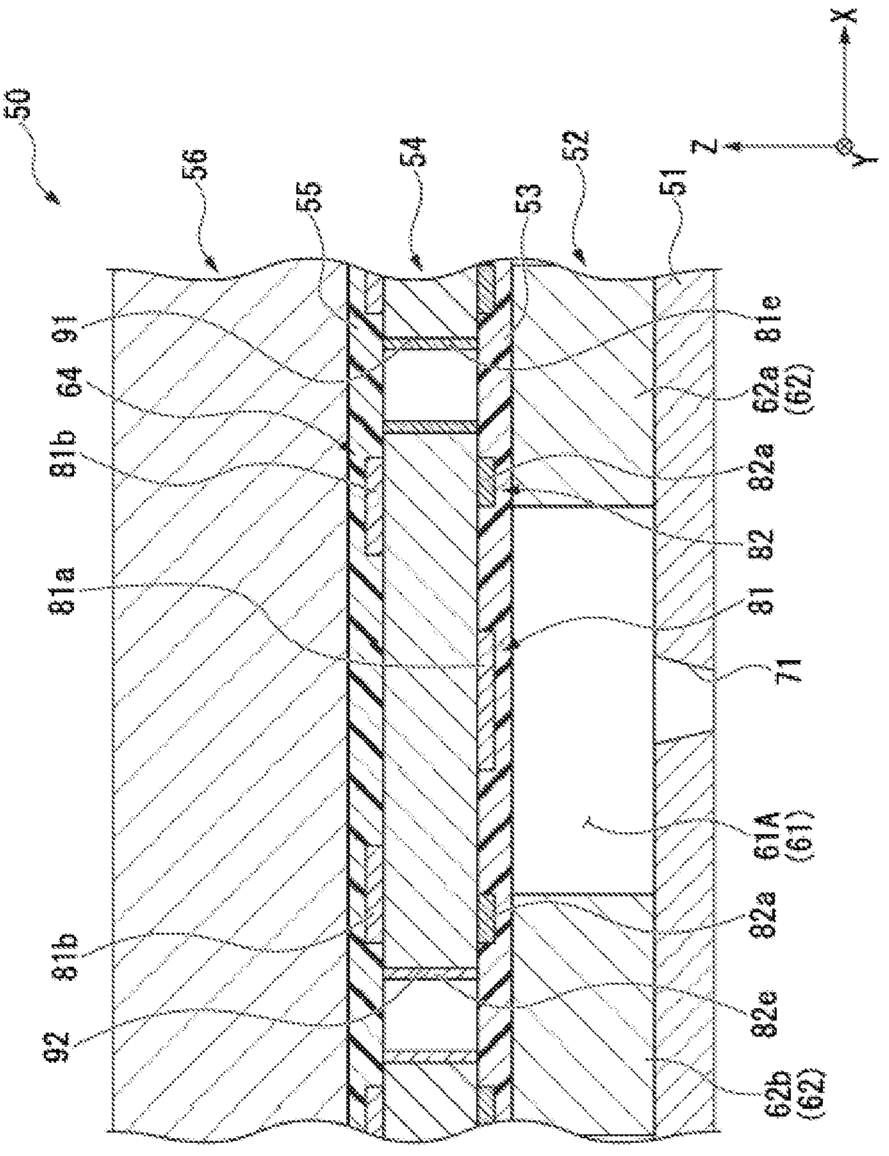
FIG. 27 is a cross-sectional view of a head chip according to a modified example.

Further, in the configuration shown in FIG. 25 described above, there is described the configuration in which the common electrode and the individual electrode are opposed to each other at the position overlapping at least the pressure chamber 61 when viewed from the Z direction, but this configuration is not a limitation. For example, as shown in FIG. 27, it is possible to adopt a configuration in which the first individual electrodes 82*a* and the second common electrodes 81*b* are opposed to each other at only the positions opposite to each other above the partition walls 62 in the state in which the first common electrode 81*a* and the first individual electrodes 82*a* are arranged side by side on the lower surface of the actuator plate 54.

In the embodiments described above, there is explained the configuration (so-called pulling-shoot) of deforming the actuator plate 54 in the direction of increasing the volume of the pressure chamber 61 due to the application of the drive voltage, and then restoring the actuator plate 54 to thereby eject the ink, but this configuration is not a limitation. It is possible for the head chip according to the present disclosure to be provided with a configuration (so-called pushing-shoot) in which the ink is ejected by deforming the actuator plate 54 in a direction of reducing the volume of the pressure chamber 61 due to the application of the voltage. When performing the pushing-shoot, the actuator plate 54 deforms so as to bulge toward the inside of the pressure chamber 61 due to the application of the drive voltage. Thus, the volume in the pressure chamber 61 decreases to increase the pressure in the pressure chamber 61, and thus, the ink located in the pressure chamber 61 is ejected outside through the nozzle hole 71. When setting the drive voltage to zero, the actuator plate 54 is restored. As a result, the volume in the pressure chamber 61 is restored. It should be noted that the head chip of the pushing-shoot type can be realized by inversely setting either one of the polarization direction and an electric field direction (the layout of the common electrodes and the individual electrodes) of the actuator plate 54 with respect to the head chip of the pulling-shoot type.

In the embodiments described above, there is described the configuration in which the electrodes on the both surfaces of the actuator plate 54 are coupled to each other through the through interconnections 81*e*, 82*e*, but this configuration is not a limitation. The coupling of the electrodes on the both surfaces of the actuator plate 54 can arbitrarily be changed. For example, it is possible for the electrodes on the both surfaces of the actuator plate 54 to be coupled to each other through a side surface of the actuator plate 54 or the like.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

a flow channel member in which a plurality of pressure chambers containing liquid is arranged in a state of being partitioned by a partition wall;

an actuator plate which is stacked on the flow channel member in a state of being opposed in a first direction to the pressure chambers, and which has a polarization direction set to the first direction; and drive electrodes which are respectively formed on a first surface and a second surface of the actuator plate, the first surface facing to a first side in the first direction, and the second surface facing to a second side as an opposite side to the first side, and which are configured to deform the actuator plate in the first direction so as to respectively change volumes of the pressure chambers, wherein the drive electrodes include a first electrode disposed on the first surface of the actuator plate so as to overlap at least one of the pressure chamber and the partition wall when viewed from the first direction, a second electrode which is disposed on the first surface of the actuator plate so as to be adjacent to the first electrode, and which is configured to generate a potential difference from the first electrode, and first opposed electrode which is individually disposed on the second surface of the actuator plate at a position opposed to the first electrode, and which is configured to generate a potential difference from the first electrode, wherein the drive electrodes include a second opposed electrode which is opposed to the second electrode on the second surface, and which is disposed so as to be adjacent to the first opposed electrode, the second opposed electrode is configured to generate a potential difference in the first direction from the second electrode, and is configured to generate a potential difference in a direction crossing the first direction from the first opposed electrode, the first surface of the actuator plate is arranged so as to be opposed in the first direction to the flow channel member, and a whole of the second electrode is disposed at a position overlapping the partition wall when viewed from the first direction.

2. The head chip according to claim 1, wherein a part of the second opposed electrode is disposed so as to be opposed to the second electrode at a position overlapping the partition wall when viewed from the first direction, and a remaining part of the second opposed electrode is disposed at a position overlapping the pressure chamber when viewed from the first direction.

3. The head chip according to claim 1, wherein a whole of the first electrode and the first opposed electrode is disposed at a position opposed in the first direction to the pressure chamber.

4. The head chip according to claim 1, further comprising a regulating member which is configured to regulate a displacement of the actuator plate toward an opposite side to the flow channel member in the first direction, and which is stacked at an opposite side to the flow channel member across the actuator plate in the first direction.

5. A liquid jet head comprising the head chip according to claim 1.

6. A liquid jet recording device comprising the liquid jet head according to claim 5.

* * * * *